Aug. 2, 1955  A. D. BENSON  2,714,355
CONVEYOR DISPATCH SYSTEM
Filed May 2, 1946  15 Sheets-Sheet 2
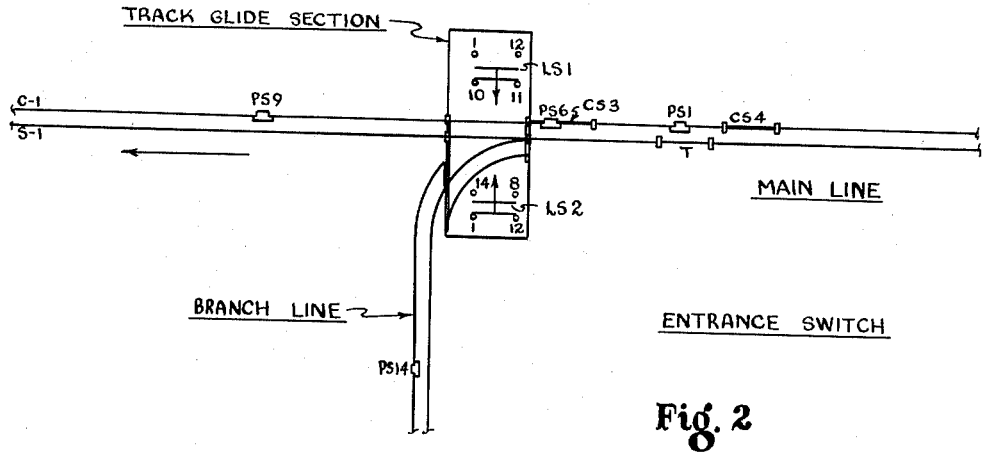
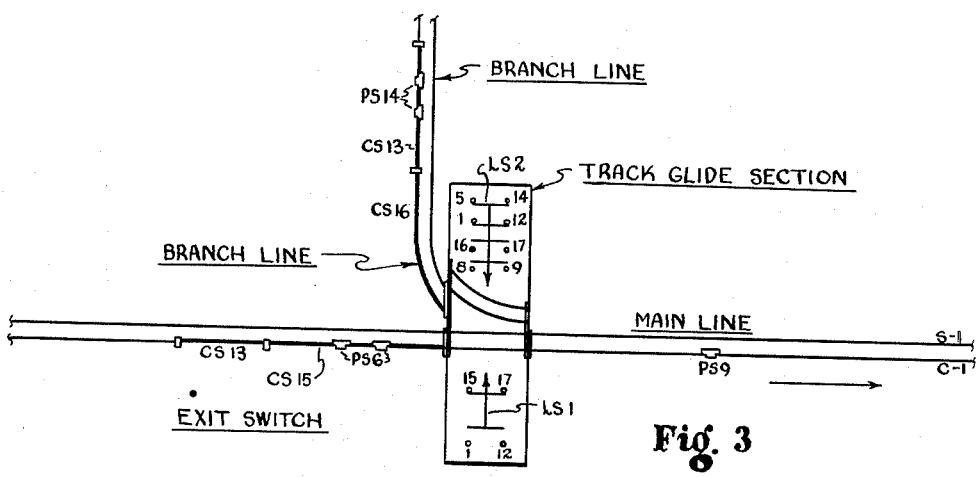
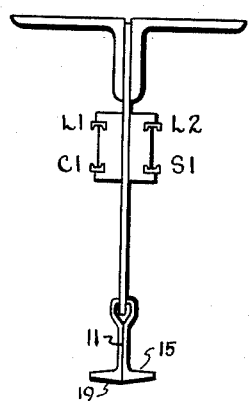
INVENTOR.
ALFRED D. BENSON
BY Joseph Harley

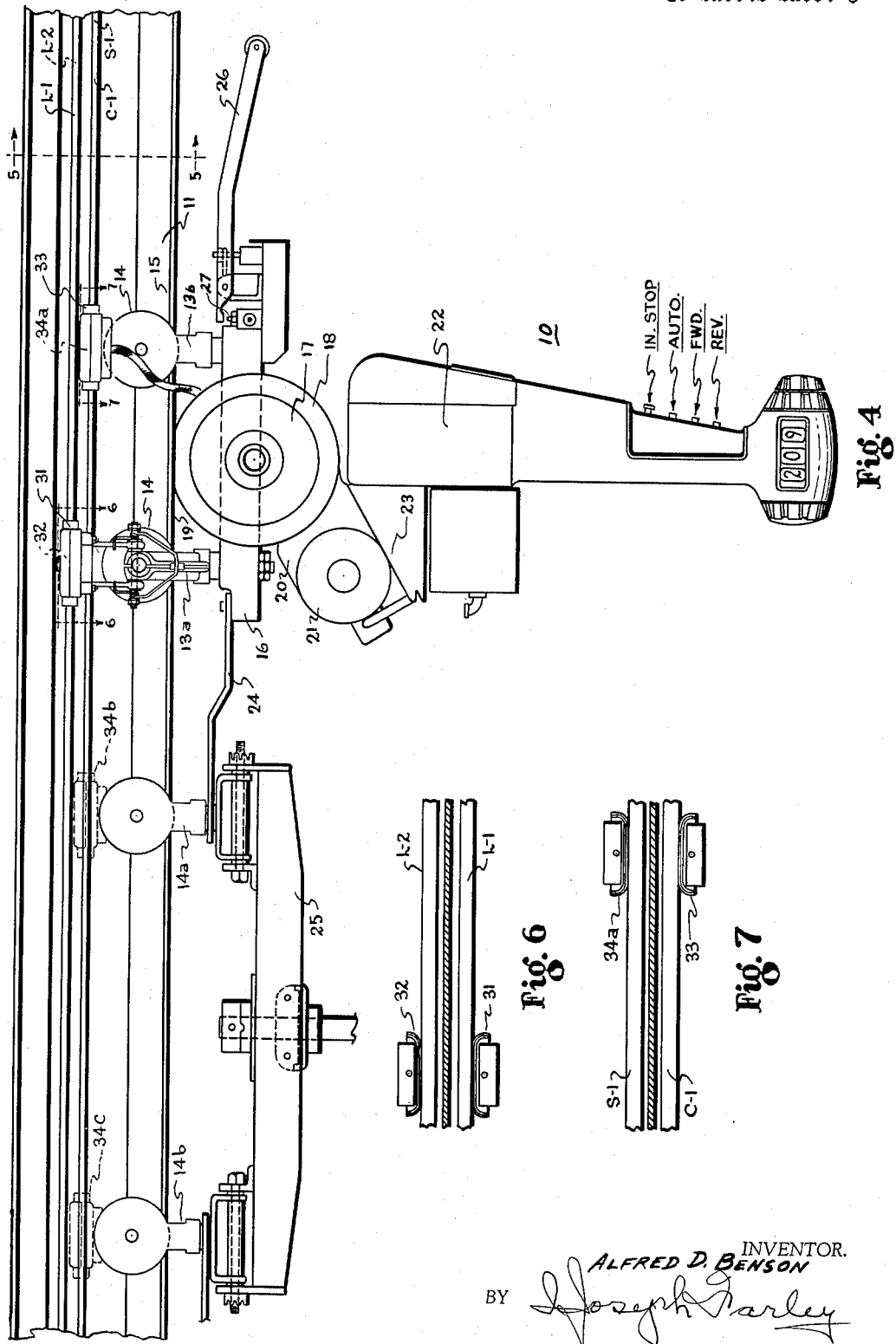

Aug. 2, 1955 A. D. BENSON 2,714,355
CONVEYOR DISPATCH SYSTEM
Filed May 2, 1946 15 Sheets-Sheet 4

INVENTOR.
ALFRED D. BENSON
BY Joseph Harley

INVENTOR.
ALFRED D. BENSON

Aug. 2, 1955

A. D. BENSON 2,714,355

CONVEYOR DISPATCH SYSTEM

Filed May 2, 1946

INVENTOR.
ALFRED D. BENSON
BY Joseph Darley

Aug. 2, 1955  A. D. BENSON  2,714,355
CONVEYOR DISPATCH SYSTEM
Filed May 2, 1946  15 Sheets-Sheet 10

INVENTOR.
ALFRED D. BENSON
BY Joseph Farley

Aug. 2, 1955     A. D. BENSON     2,714,355
CONVEYOR DISPATCH SYSTEM

Filed May 2, 1946     15 Sheets-Sheet 11

INVENTOR.
ALFRED D. BENSON
BY Joseph Harley

Aug. 2, 1955      A. D. BENSON      2,714,355
CONVEYOR DISPATCH SYSTEM
Filed May 2, 1946      15 Sheets-Sheet 12

INVENTOR.
ALFRED D. BENSON
BY Joseph Farley
ATTORNEY.

Aug. 2, 1955  A. D. BENSON  2,714,355
CONVEYOR DISPATCH SYSTEM
Filed May 2, 1946  15 Sheets—Sheet 13

INVENTOR.
ALFRED D. BENSON
BY Joseph Farley
ATTORNEY.

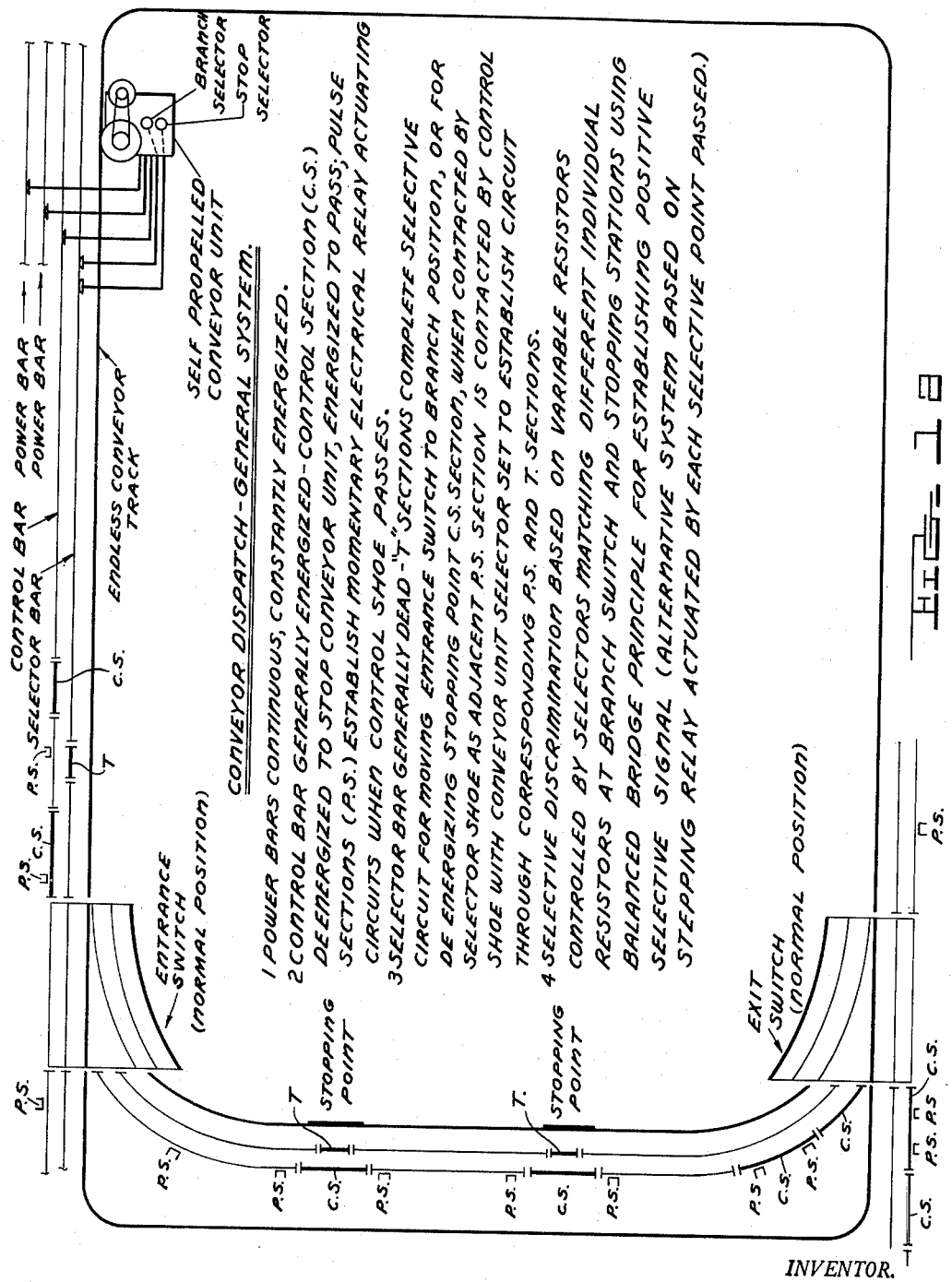

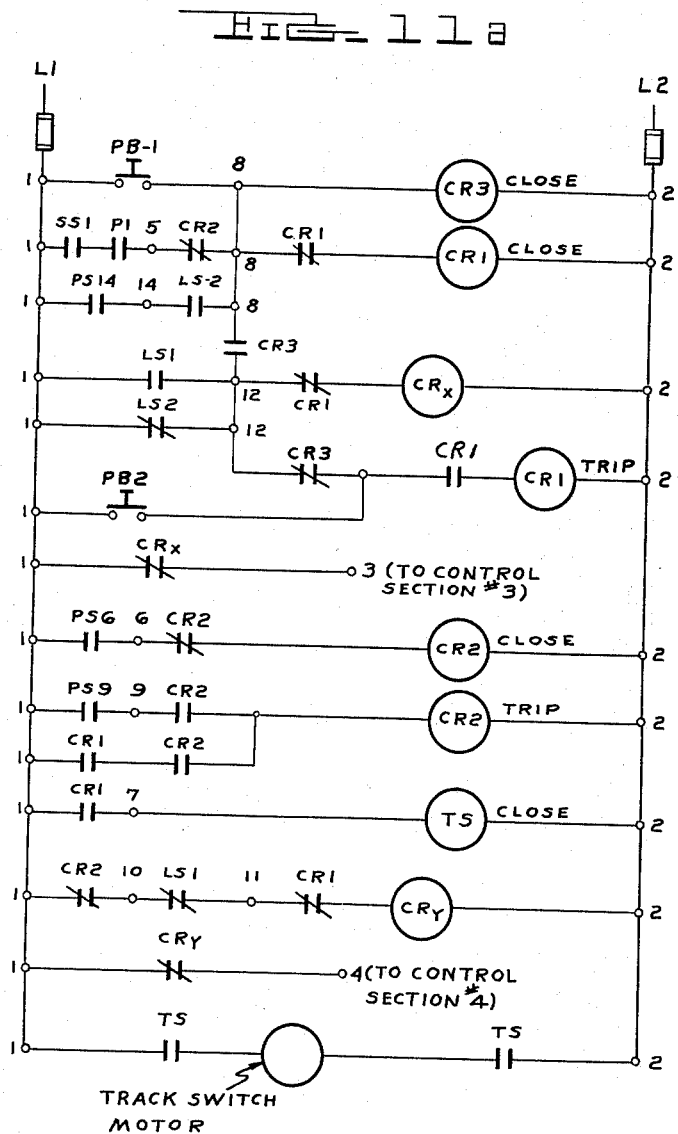

United States Patent Office 2,714,355
Patented Aug. 2, 1955

2,714,355

CONVEYOR DISPATCH SYSTEM

Alfred D. Benson, Detroit, Mich., assignor to Mechanical Handling Systems Inc., Detroit, Mich., a corporation of Michigan Application May 2, 1946, Serial No. 666,609

46 Claims. (Cl. 104—88)

This invention relates to overhead trolley conveyor systems and more particularly to systems incorporating the use of self-propelled electrically powered driving units for moving load carriers along conveyor tracks.

The use of self-propelled driving units in modern industrial conveyor systems is finding wide application in a large variety of installations and has particular advantages over conventional chain or other power driven conveyors where load carriers must be driven not over a single continuous conveyor line alone, but over numerous branch and sub-branch lines where they are frequently stopped for loading, unloading, or the performance of operations most conveniently accomplished with the load at rest. However, the flexibility and adaptability of self-propelled units to innumerable conveyor requirements of this nature is accompanied by a number of inherent and difficult problems of control.

In a single line chain driven conveyor, the relative spacing and speed of the load carriers is automatically determined by the single chain drive and the "traffic" problems incident to a system where large numbers of independently driven units having a multitude of destinations in a network of conveyor lines are not encountered. In a conveyor system of the type contemplated in the present invention, where it is desired to be able to set the controls of driving units for various particular destinations and have them automatically find their way along the necessary conveyor paths to reach such destinations, each driving unit must be independently controlled and such control must extend to the numerous track switches which determine the path of the driving unit and load carriers along the main lines or branch lines as the case may be.

Ultimately such controls are directed to the motors of the monotractor driving units and the motors of the various track switches and must include a signaling system within each driving unit capable of selectively initiating movement of the track switches to positions corresponding to the paths required to reach the various destinations.

It may be readily seen that any number of destinations or stations may be incorporated within a conveyor system comprising a single endless main track, an appropriate number of branch tracks, sub-branch tracks, etc., and that by providing a main and branch switch position at each juncture, a driving unit may be dispatched from any point in the system to any other point provided only that the switches at each juncture are in their proper positions when such driving unit passes through. It may also be readily seen that if each branch track leads back to the main track and each sub-branch track leads back to a branch track, a driving unit will be able to find its own way back from any station to the main track without the necessity of selective signals. Thus, the problem of selective signaling may be reduced to entrance switches only, from main line to branch, branch to sub-branch, etc.

Another factor which helps to answer the selective signaling problem is that if provision is made for each main-branch switch to be normally in main position, each branch-sub-branch switch in branch position, etc., and for each switch to remain in or return to normal position after a driving unit has passed through it, each track switch need be responsive only to positive selective signals requiring its movement to the abnormal branch or sub-branch position as the case may be. For example, in a conveyor system having one main line, ten branch lines, each branch line having ten sub-branch lines, each sub-branch line having ten sub-sub-branch lines for a total of 1,000 sub-sub-branch lines, only three positive selective signals would be required to guide a driving unit from any point in the system to any sub-sub-branch line; one for the proper branch switch, sub-branch switch, and sub-sub-branch switch, respectively.

Moreover, only three signaling units, each with ten settings need be provided in such driving unit to provide complete directional dispatching control in such system; one for the main-branch switches, one for the branch-sub-branch switches, and one for the sub-branch-sub-sub-branch switches, since the identical ten branch-sub-branch signals could be used in each of the ten branch lines, and the identical ten sub-branch-sub-sub-branch signals could be used in each of the 100 sub-branch lines.

If two additional features are added to such system, one to prevent a driving unit from approaching a switch until the preceding unit has passed through it and the switch is in normal position, and another to give priority to either one of two units simultaneously approaching an exit switch from different lines, a system would be provided wherein 1,000 driving units at any 1,000 points in the system could be simultaneously set for the 1,000 sub-sub-lines, and each would automatically find its way to its respective line without accident or mishap. The possibilities of expanding such system are almost limitless. Thus, by adding one additional ten position selective signal unit to each driving unit, selectivity could be provided for 10,000 additional branch lines added to the sub-sub-branch lines.

It is the principal object of the present invention to provide a conveyor system that will permit the simultaneous dispatching of self-propelled driving units from any number of points in a conveyor system to any like number of destinations in such system, each unit being capable of automatically following the necessary conveyor path to reach its destination.

Another object of the invention is to provide a conveyor system which will have a single main track, and any desired number of branch tracks, sub-branch tracks, etc., each of said branch tracks having an entrance from and exit to said main track, and each of said sub-branch tracks having an entrance from and exit to a branch track, etc. and each juncture being provided with a two way track switch.

A further object of the invention is to provide a means for normally retaining both entrance and exit main-branch switches in main position, branch-sub-branch switches in branch position, etc. and for returning such switches to normal position after the passage of a driving unit through its other position.

Another object of the invention is to provide a means for preventing a driving unit from approaching any track switch until the preceding unit has passed through such switch and the switch is in normal position.

A further object of the invention is to provide a selective signaling means within each driving unit for initiating the movement of particular track switches from their normal to their branch positions, whereby each driving unit may be dispatched from any point in the system to any branch or sub-branch line in the system.

Another object of the invention is to provide a selective signaling means within each driving unit for causing the driving unit to stop when it has reached its destination.

A further object of the invention is to provide means at each entrance track switch responsive to a signal from an approaching driving unit for moving such switch from its normal position to its other position.

Another object of the invention is to provide means at each exit switch for causing such switch to move from its normal position to its branch position when any driving unit approaches such switch along a branch line, and for giving priority to one of two driving units simultaneously approaching such exit switch from different lines.

A further object of the invention is to make such conveyor system adaptable to various types of A. C. and D. C. power supply systems.

Another object of the invention is to provide a number of new electrical circuits as well as new combinations of old circuits in order to accomplish the above objectives.

A further object of the invention is to provide for independent manual as well as automatic control for each track switch and for each driving unit.

Another object of the invention is to provide a physical-electrical response means to be used at various points along the conveyor lines as a part of the control system.

A further object of the invention is to provide an improved construction for a power collector used in contacting the power conductors.

These and many other objects will appear more clearly from the following more detailed description of a particular embodiment of my invention and from an examination of the drawings forming a part hereof wherein, Fig. 1 is a typical plan view of a conveyor layout showing a main line conveyor track, branch tracks, sub-branch tracks, and stopping points.

Fig. 2 is a schematic plan view of a typical entrance track switch.

Fig. 3 is a schematic plan view of a typical exit track switch.

Fig. 4 is a layout side elevation of a typical driving unit in running position on a track.

Fig. 5 is a sectional end elevation of the conveyor track taken along the line 5—5 of Fig. 4 showing the electrical conductor bars mounted above the track.

Fig. 6 is a plan view taken along the line 6—6 of Fig. 4.

Fig. 7 is a view partly in section taken along the line 7—7 of Fig. 4.

Fig. 11a is a similar diagram modified for adaptation to a two bar system.

Figure 1:
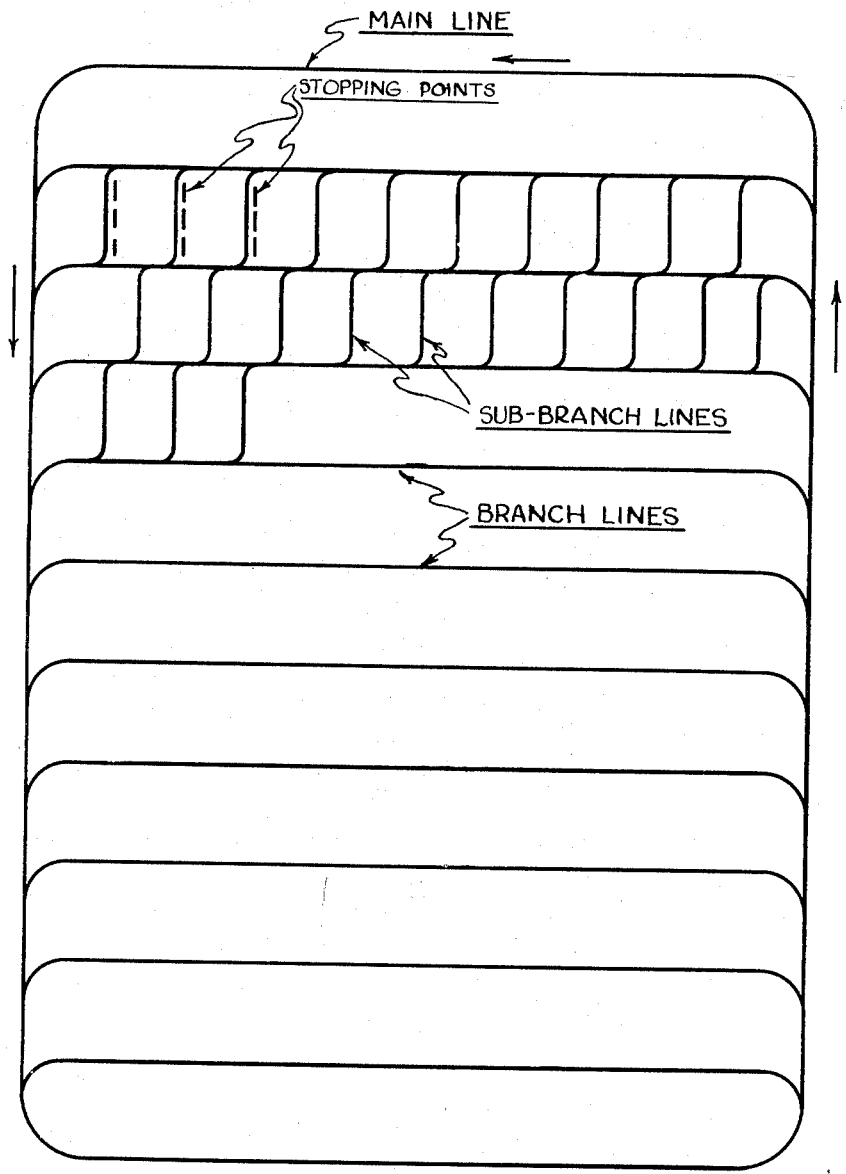
Fig. 1a is a schematic diagram showing the principal features of the present selective conveyor dispatch system applied to a single branch track with two stopping points including a brief general description of their interrelation.

Referring to Fig. 1, the conveyor layout chosen for illustration includes a main line, and ten branch lines, each branch line having ten sub-branch lines, and each sub-branch line having three stopping points. Thus, a total of three hundred stopping points are provided. The direction of travel of the driving units along the conveyor line, as indicated in Fig. 1, is generally counter-clockwise and in order to proceed from the main line to any stopping point, a driving unit would travel up the right hand main line, as shown in Fig. 1, turn left at the proper branch line, turn left again at the proper sub-branch line and proceed to the proper stopping point. In order to return to the main line, the driving unit would proceed to the end of the sub-branch line, turn right onto a branch line and left onto the main line.

Each of the junctures is provided with an identically constructed two way glide switch of the type schematically shown in Figs. 2 and 3. Each of the glide switches joining main and branch lines is normally in main line position and each of those joining branch and sub-branch lines is normally in branch position. Thus, in order to proceed from the main line to any particular stopping point, three selective signals are required; one for a track switch at the proper branch line juncture, one for a track switch at the proper sub-branch juncture, and one for the proper stopping point. In rejoining the main line, a signal for a track switch is required at each juncture but such signal need not be selective since only one path exists for passing through each exit switch.

DRIVING UNITS

The driving units in the present case are electrically powered monotractors of the type shown in Fig. 4. Each monotractor 10 is suspended from the conveyor track 11 by means of a pair of longitudinally spaced bracket members 13a and 13b whose wheels 14 run along the top surface 15 of the conveyor track 11. The bracket members 13a and 13b support a longitudinal framework 16 which provides a journal for the driving wheel 17 centrally located with respect to the bracket members 13a and 13b. The driving wheel is provided with a rubber tire 18 which bears against the lower surface 19 of the inverted T-shaped conveyor track 11.

The driving wheel journal provided in the framework 16 is spaced relative to the conveyor track 11, a vertical distance such as will provide compression between the conveyor track and the driving wheel. Mounted under the framework 16 is a bracket 20 for mounting an electric motor 21 geared to the driving wheel by means not shown. The monotractor control housing 22 is in turn mounted to the lower surface 23 of the bracket member 20. At the rearward end of the monotractor driving unit a coupling bar 24 is provided for attaching a series of load carriers 25 which are also suspended from the conveyor track 11 by suitable trolley wheel conveyor brackets 14a and 14b. At the forward end of the monotractor driving unit an arm 26 is provided for contacting a tailpiece provided at the rearward end of any preceding load carrier. Power to the driving motor passes through a circuit which is broken by the upward movement of the outward end of arm 26, depressing a limit switch 27 and thus automatically preventing any monotractor from overtaking and pushing from the rear any preceding load carrier.

Power for driving the monotractor is supplied through two power conductor bars L1 and L2, as shown in Fig. 5, mounted above the conveyor track 11. Two additional conductor bars C1 and S1 are mounted below the power conductor bars for control and selection purposes to be hereinafter described.

Two power collector shoes 31 and 32 (Fig. 4) are mounted on the rearward conveyor bracket members 13a for contacting, respectively, the power conductor bars L1 and L2. A control shoe 33 and selector shoe 34a are mounted on either side of the forward conveyor bracket 13b for contacting the control and selector bars C1 and S1, respectively (see Figs. 4 and 7). Two additional selector shoes 34b and 34c are mounted on conveyor brackets 14a and 14b which serve to support the first of the load carrying members 25 for contact with the selector bar S1.

Referring to Fig. 5, the power used to drive the monotractor and track switch motors and to energize the control and selection circuits is derived from a three-phase power supply (grounded third phase). Two phases of this power supply are constantly carried throughout the entire system by the upper conductor bars L1 and L2 so that power is at all times supplied to the monotractor contactor shoes 31 and 32 which ride on these bars. The third phase of the three-phase monotractor driving motor is grounded through the main body of the conveyor track. The lower conductor bars C1 and S1 are respectively the control bar and the selector or signal bar referred to above which are contacted by monotractor contactor shoes 33, 34a, 34b and 34c.

The control bar C1 is directly connected to the power bar L1 except at insulated control sections in C1. The power from L1 to these control sections passes through certain control circuits to be hereinafter described.

Figure 8:
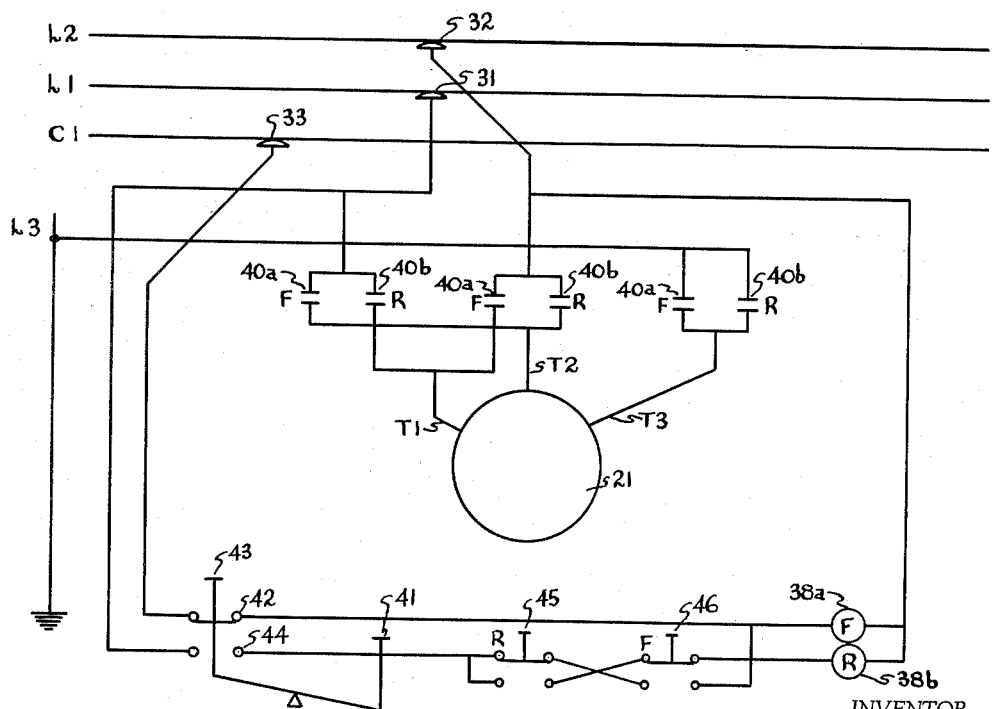
Fig. 8 is a schematic diagram of the driving unit control circuit.

In Fig. 8 the monotractor control circuit is shown by schematic representation. The monotractor motor 21 is a three-phase motor and when operating in a forward direction motor lead T-1 is energized by the power carried in power conductor L2, motor lead T-2 is supplied with power from conductor L1 and motor lead T-3 is connected to ground through the main body of the conveyor track designated L3. When the motor is operating in reverse, lead T-1 is supplied from conductor L1 and lead T-2 is supplied from conductor L2. When either the forward 40a or the reverse 40b contacts leading to the motor leads are closed, power from conductor bars L1 and L2 passes through collector shoes 31 and 32, and through contacts 40a or 40b to the monotractor motor 21. The opening and closing of contacts 40a and 40b is controlled by the forward 38a and reverse 38b coils of a two coil solenoid line starter relay. During automatic operation the forward coil 38a of this relay is energized by a circuit passing from conductor L2 to conductor C1 passing through such coil and the closed contacts 42 of the "Inch" stop button 43. Thus, when control section of conductor C1 become de-energized, the relay coil 38a becomes de-energized and contacts 40a are opened thereby stopping the monotractor motor. When the "Inch" stop button 43 is depressed, contacts 42 are opened and contacts 44 are closed connecting conductor L1 with the forward or reverse coils 38a or 38b by a circuit passing through spring return push buttons 45 and 46.

During automatic operation the monotractor operates only in a forward direction and is controlled by de-energized sections in control bar C1, whereas during locally controlled operation, forward and reverse "inching" control is accomplished by depressing the inch stop button 43 and the forward or reverse push buttons 46 and 45 establishing a circuit which by-passes control bar C1. Thus, the monotractor may be operated in either direction by manual control throughout de-energized control sections as well as over any other section of the conveyor track.

ENTRANCE SWITCH

Referring to the conveyor track entrance switch shown in Fig. 2, pulse sections identified as PS-1, PS-6, PS-9 and PS-14 are located in the control bar C1 and are contacted by the previously described monotractor control shoe 33. These pulse sections form a part of the control circuit and momentarily close an electrical circuit in response to the physical contact of the control shoe 33 of a passing monotractor. Such electrical circuits serve as non-selective signals in connection with the energizing and de-energizing of control sections CS-3 and CS-4 in conductor bar C1 and in connection with movement of the track glide switch. Pulse section PS-1 in conjunction with a selective signal from a passing monotractor (hereinafter described in detail) serves to signal for the track glide switch to move from a normal to a branch position. Pulse section PS-14, contacted after a monotractor train has passed through the switch in branch position, serves to signal for the track glide switch to return to normal position. Pulse section PS-6 serves to signal for control section CS-4 to be de-energized and pulse section PS-9, contacted after a train has passed through the switch in normal position, serves to signal for control section CS-4 to be re-energized.

Figure 9:
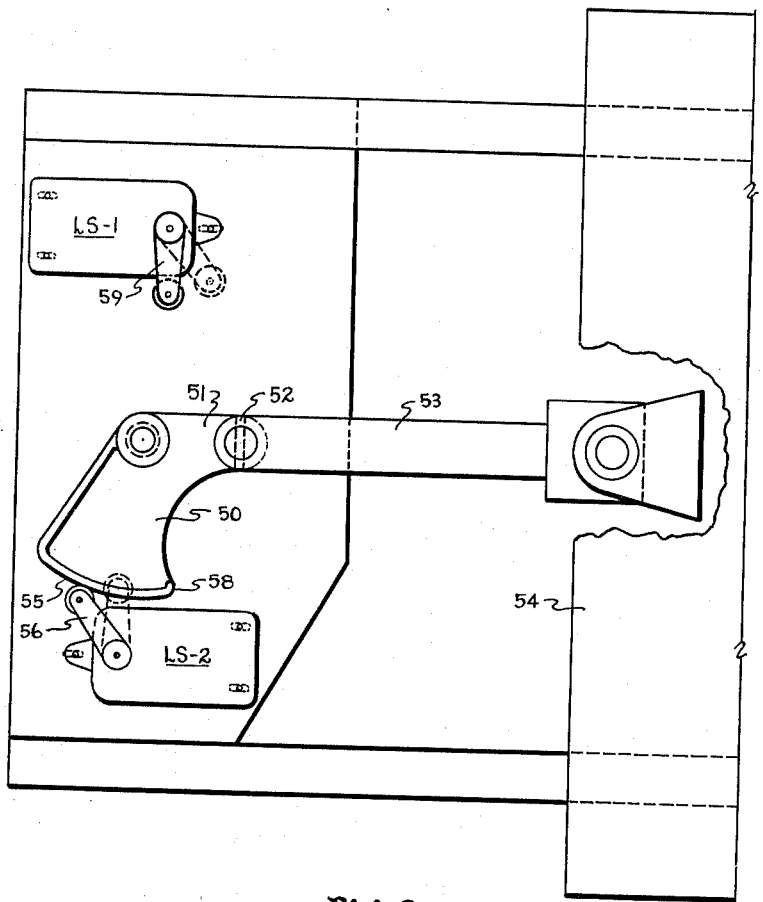
Fig. 9 is a fragmentary plan view of a portion of a track glide switch.

In Fig. 9 the operation of the track glide switch and limit switch is shown. A track switch motor (not shown) is geared to rotate the cam member 50 provided with an arm 51 connected by a pin 52 to a coupling member 53 which in turn is articulately connected with one end of the movable frame 54 on which the switch tracks (not shown) are mounted. Rotation of the cam 50 thereby produces a linear oscillatory motion to the movable frame 54 of the track switch. Rotation of the cam through 180° from the normal position shown in Fig. 9 moves the track switch to its branch position and rotation of such cam through the next 180° returns it to normal position. In the position shown the edge 55 of the cam 50 depresses the arm 56 of a limit switch LS-2 holding it in a closed position. As the cam 50 rotates in a clockwise direction, the edge 55 continues to contact the arm 56 until the rear edge 58 of the cam passes such arm whereupon spring means trips the limit switch moving the arm 56 to the position shown in dotted lines. As the cam rotates in a clockwise direction through 180° it contacts the arm 59 of a second limit switch LS-1 fully depressing such arm after it has rotated 180°. This closes the limit switch LS–1. Referring to limit switches LS–1 and LS–2 schematically shown in Fig. 2, contacts 8, 14 in limit switch LS–2 are opened and contacts 1, 12 closed when the arm 56 is depressed, and such contacts are reversed when the limit switch is tripped. Contacts in limit switch LS–1 are likewise reversed when arm 59 is depressed and returned to normal when the rear edge 58 of the cam 50 passes arm 59. Electrical circuits closed by limit switches LS–1 and LS–2 upon completion of the track switch's travel in either direction serve as a signal for stopping the track switch motor. Circuits through these limit switches are also used in connection with energizing and de-energizing control sections CS–3 and CS–4.

The operation of the entrance glide switch schematically shown in Fig. 2 may be summarized in general terms as follows: The track switch is normally in straight position and control sections CS–3 and CS–4 are normally energized. An approaching monotractor will pass through control section CS–4 and contact pulse section PS–1. If a positive selective track switch signal is not given, the track switch will remain in normal straight position and the monotractor will proceed through control section CS–3 and will contact PS–6 giving a signal for control section CS–4 to be de-energized. Control section CS–4 will remain de-energized, stopping any following monotractor, until the first monotractor has passed through the switch and contacted pulse section PS–9 giving the signal for control section CS–4 to be re-energized.

If, as a monotractor contacts pulse section PS–1, a positive selective track switch signal is simultaneously given, the track switch motor is started and control sections CS–3 and CS–4 are de-energized. The monotractor is thereby prevented from entering the switch while the switch is in motion. When the track has reached its branch position, limit switch LS–1 signals for the track switch motor to stop and for control section CS–3 alone to be re-energized. Upon passage of the monotractor through the entrance track switch, pulse section PS–14 is contacted signaling for the track switch motor to start. When the switch has returned to normal position, limit switch LS–2 signals for the track switch motor to stop and for control sections CS–3 and CS–4 to be re-energized.

Figure 10:
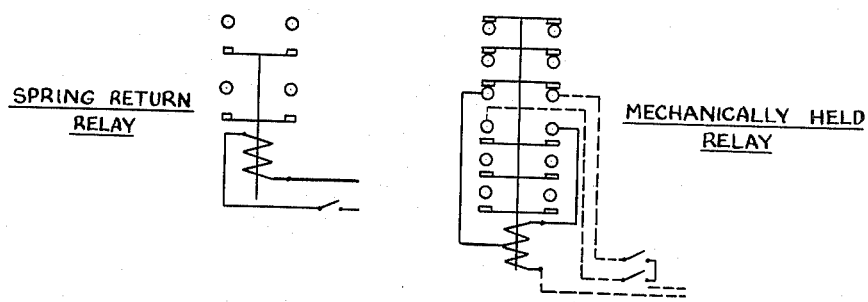
Fig. 10 is a schematic representation of the mechanically held and spring return types of solenoid relays used in the various control circuits.
Figure 11:
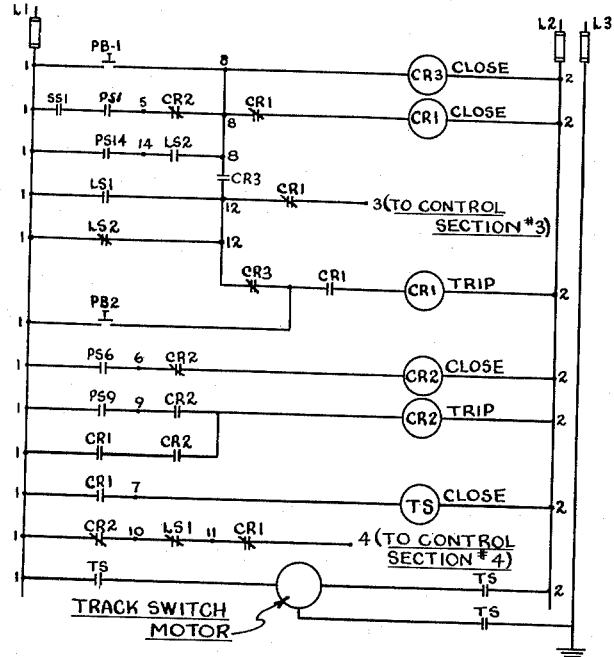
Fig. 11 is a schematic diagram for the entrance track switch control circuit.

With reference to Fig. 11, the control circuit for accomplishing the above operations includes in addition to the control sections, pulse sections and limit switches mentioned above, two latched in mechanically held relays CR–1 and CR–2 and one auxiliary spring return control relay CR–3 of the type schematically shown in Fig. 10, one track switch motor contactor TS and two single pole spring return push button stations PB–1 and PB–2.

Mechanically held control relays CR–1 and CR–2 each have two positions which may be referred to as "closed" and "tripped" positions. Each relay is actuated by a divided electromagnetic coil having two energizing circuits. Momentary energizing of one circuit closes the relay and it remains closed after the energizing current has stopped until the other circuit is momentarily energized tripping the relay. A number of individual circuit contacts are opened and closed or closed and opened respectively when each relay is in closed or tripped position.

The auxiliary relay CR–3 is a two position single coil spring return relay which is closed by energizing the coil and automatically tripped by a spring when the energizing current stops.

The track switch motor contactor TS, when energized, connects the track switch motor to the two power phases supplied by conductor bars L1 and L2, and to the grounded third phase.

The two spring return push buttons PB–1 and PB–2 are used only for local operation of the track switch.

Power for the control circuit is supplied from conductor bars L1 and L2 shown along each side of the diagram and each of the individual circuits connected to such power lines is shown in the diagram in its normal condition when no monotractor is approaching the switch. The open pulse section PS circuits are closed by physical monotractor contact; each open and each closed CR–1, CR–2 and CR–3 circuit contact is reversed when the relays CR–1, CR–2 and CR–3 are respectively closed; the limit switch LS–2 contacts are reversed when the track switch leaves its normal position and the limit switch LS–1 contacts are reversed when the track switch reaches branch position. Limit switch LS–1 and LS–2 contacts are respectively returned to normal when the track switch leaves branch position and when it reaches normal position. The respective relay and contactor coils are designated by encircled letters CR–1, CR–2, CR–3 and TS.

As indicated in this diagram, the track switch motor is energized only when the contactor coil TS is energized and the contactor coil TS is controlled by the normally open CR–1 contacts in series with such coil. This contact is closed, energizing contactor coil TS, when control relay CR–1 is closed.

Control section CS–3 is controlled primarily by the normally closed CR–1 contact in series with such section. This CR–1 contact is opened when control relay CR–1 is closed, thus de-energizing control section CS–3 while the track switch motor is running and the track switch is in motion. During automatic operation, the energizing circuit to control section CS–3 must also pass through the contacts 1—12 of either limit switch LS–1 or LS–2. Thus, if control relay CR–1 should be tripped accidentally before the track switch has reached either normal or branch position, control section CS–3 would remain de-energized.

Control track section CS–4 is normally energized by closed contacts in control relay CR–2, limit switch LS–1 and control relay CR–1 in series with such section. Thus, control track section CS–4 is de-energized when control relay CR–2 is closed, when the track switch is in any other than normal straight position, or when control relay CR–1 is closed.

Control relay CR–2 is closed by a momentary circuit through pulse section PS–6 and a normally closed CR–2 contact. It is tripped after a monotractor passes through the switch in straight position by a momentary circuit through pulse section PS–9 and a CR–2 contact which becomes closed when control relay CR–2 is closed. It is tripped after a monotractor passes through the switch in branch position by a circuit through CR–1 and CR–2 contacts which become simultaneously closed when control relay CR–1 is closed in response to a signal from pulse section PS–14.

The primary functions of control relay CR–1 are to start the track switch motor in response to a positive selective signal from pulse section PS–1 and signal section SS–1; to stop the track switch motor, when the branch position has been reached, in response to the closing of contacts 1—12 in limit switch LS–1; to start the track switch motor for returning the switch to normal position after a monotractor has passed through the switch in response to a momentary closed circuit through pulse section PS–14; and to stop the track switch motor when the normal straight position has been reached in response to the closing of contacts 1—12 in limit switch LS–2. A secondary function of control relay CR–1 is to de-energize control sections CS–3 and CS–4 while the track switch motor is in operation. The function of control relay CR–3 is auxiliary to control relay CR–1 and acts to prevent closed circuits through pulse sections PS–1 and PS–14 and limit switches LS–1 and LS–2 from alternately closing and tripping control relay CR–1 except at the required times indicated above.

In order to accomplish the above functions control relay CR–1 has six contacts, three of which are normally closed and three of which are normally open. The normally closed contacts of control relay CR–1 include contacts in series with control section CS-3, control section CS-4 and the closing coil of control relay CR-1. The latter contact provides required residual magnetism for holding the relay by opening the circuit to the coil at the very moment the relay closes.

The normally open CR-1 contacts include those in series with the track switch motor contactor TS, the tripping coil of control relay CR-1 and the tripping coil of control relay CR-2. The closing of the CR-1 contact in series with the tripping coil of control relay CR-1 places this coil in a position to be energized by the closing of contact 1—12 in limit switch LS-1 or LS-2 when the track switch has reached branch position or normal position respectively. The closing of the CR-1 contact in series with the tripping coil of control relay CR-2 serves no function while the track is moving to branch position since the CR-2 contact also in series with such coil is open during this time. However, when the track switch starts to return from branch to normal position, such CR-2 contact is closed and the closing of the CR-1 contact serves to trip control relay CR-2.

Either the momentary energizing of pulse section PS-1 when signal contact SS-1 is closed or the momentary energizing of pulse section PS-14 will serve to close control relay CR-3 which in turns opens the CR-3 contact in series with the CR-1 tripping coil and closes the CR-3 contact between points 8 and 12. The open CR-3 contact in series with the tripping coil of control relay CR-1 is required since both the duration of the collector shoe's contact with pulse sections PS-1 or PS-14 and the time required for the angular movement of the track switch cam 50 sufficient to open the contacts 1—12 in limit switch LS-2 when the switch is starting to move to branch position, or in limit switch LS-1 when the switch is starting to return to normal position, are considerably longer than the time required for closing the control relay CR-1 upon establishment of a circuit through either of the pulse sections PS-1 or PS-14. Thus, in the absence of such CR-3 contacts, the circuits 1—12 through limit switches LS-1 or LS-2 would immediately trip control relay CR-1 as soon as it were closed whereupon the circuit through pulse sections PS-1 or PS-14 would again close the relay. Such alternate closing and tripping would continue at the rate of about 30 cycles per second until the pulse circuit opened whereupon the circuit through limit switch LS-1 or LS-2 would finally trip control relay CR-1 before any appreciable movement of the track switch had taken place. The normally open CR-3 contact between points 8 and 12 prevents a circuit through limit switch LS-1 or LS-2 from closing control relay CR-1, but permits a circuit through limit switch LS-1 or LS-2 to maintain control relay CR-3 in closed position and thereby prevents the tripping of control relay CR-1 until the track switch motor and cam have moved far enough to open the contacts 1—12 in limit switch LS-1 or LS-2. As soon as such opening occurs, the circuit to the closing coil of control relay CR-3 is opened, the coil is de-energized and the relay is automatically tripped by spring means. This returns the CR-3 contact between points 8 and 12 to open position and the CR-3 contact in series with the tripping coil of control relay CR-1 to closed position whereupon the circuit 1—12 through limit switch LS-1 or LS-2 which is closed upon completion of the track switch's travel will be able to trip control relay CR-1.

Figure 12:
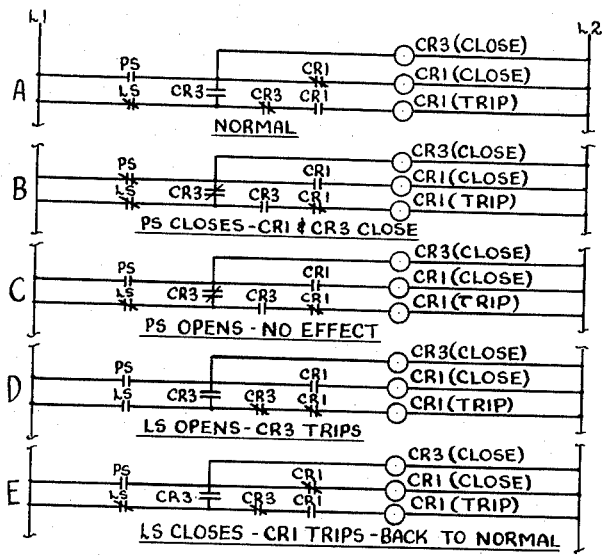
Fig. 12 is a schematic diagram of a simplified circuit showing the operation of control relay CR-3.

In order to more clearly point out the operation of control relay CR-3 in connection with the entrance track switch control circuit, a schematic diagram of a simplified circuit using such control relay has been shown in Fig. 12 with five progressive stages of the circuit's operation shown in detail. A single pulse section and limit switch have been shown instead of the two pulse sections and two limit switches used in the standard entrance switch and the circuits shown are confined to those affected by the operation of control relay CR-3. Diagram A shows such simplified circuit in normal condition. In Diagram B a circuit through the pulse section PS has closed control relay CR-1 and auxiliary control relay CR-3 reversing their respective contacts. The normally closed CR-3 contact in series with the tripping coil of control relay CR-1 which is now open prevents the closed circuit through limit switch LS from immediately tripping control relay CR-1. The now closed CR-3 contact completes a circuit through limit switch LS to the closing coil of control relay CR-3. Thus, as shown in Diagram C when the control shoe of the monotractor passes by the pulse section PS and the circuit through such section opens, control relay CR-3 is maintained in a closed position by the circuit passing through limit switch LS. The circuit remains in this condition until the track switch has moved sufficiently to open the normally closed contacts in limit switch LS. When such opening occurs, the circuit which has maintained control relay CR-3 in a closed position is opened and the spring means within control relay CR-3 returns it to normal position whereupon both CR-3 and CR-1 contacts in series with the tripping coil of control relay CR-1 are closed. Thus, when the circuit through limit switch LS recloses, control relay CR-1 is tripped returning the circuit back to its normal condition.

Analyzing the operation of the automatic control circuit at a standard entrance switch from the standpoint of time sequence, the track is normally in straight position with control sections CS-3 and CS-4 energized and all individual circuits in the state shown in Fig. 11. A monotractor approaching the switch will pass through control section CS-4 and contact pulse section PS-1. If the positive selective signal contact SS-1 is closed, a circuit from conductors L1 to L2 through pulse section PS-1 and the selective signal contact SS-1 will close control relay CR-1. The closing of control relay CR-1 opens the three normally closed CR-1 contacts in series with control section CS-3, control section CS-4 and the closing coil of control relay CR-1 respectively, and also closes the three normally open CR-1 contacts in series with the track switch motor contactor TS, the tripping coil of control relay CR-1 and the tripping coil of control relay CR-2. Simultaneously, control relay CR-3 is closed reversing its contacts by a circuit passing from L1 to L2 through pulse section PS-1 and the selective signal contact SS-1. The action thus far described takes place within approximately one power cycle from the time pulse section PS-1 is initially contacted. At this moment control sections CS-3 and CS-4 are de-energized and the track switch motor is starting to move the track switch to branch position. The monotractor continues to move and the control shoe of the monotractor continues to contact pulse section PS-1 for a period of time equal to approximately 15 power cycles. At the end of this contact the circuit through pulse section PS-1 is opened but the circuit passing from L1 to L2 through contacts 1—12 in limit switch LS-2 continues to hold control relay CR-3 closed until the switch has moved far enough to open contacts 1—12 in limit switch LS-2 whereupon control relay CR-3 is automatically tripped by a spring returning its contacts to normal position. Meanwhile, the switch has continued to move toward branch position and the monotractor has proceeded toward control section CS-3.

The relative speed of the track switch movement, monotractor movement, and space between pulse section PS-1 and control section CS-3 is such that the switch will ordinarily have completed its movement to branch position before the monotractor reaches control section CS-3, so that the monotractor may ordinarily pass through such control section and switch without stopping. However, in the event the track switch has not completed its movement to branch position, the monotractor will be stopped by de-energized control section CS-3 until such movement is complete. At such time the contacts 1—12 in limit switch LS-1 will be closed, and the circuit from L1 to L2 through limit switch LS–1 will trip control relay CR–1 returning all six CR–1 contacts to their normal position. The track switch motor will thereby be stopped and control section CS–3 re-energized. Control section CS–4 will remain de-energized due to the open contacts 10—11 in limit switch LS–1. Contacts 14—8 in limit switch LS–2 will be closed making it possible for a circuit through pulse section PS–14 to complete the circuit to the closing coil of control relay CR–1. The monotractor will proceed through control section CS–3 and contact pulse section PS–6 closing control relay CR–2 which will open the CR–2 contact in series with control section CS–4 and close the CR–2 contact in series with the tripping coil of control relay CR–2. After passing through the track switch, the monotractor will contact pulse section PS–14 closing control relay CR–1. The operation of the control circuit at this point is the same as upon the initial closing of control relay CR–1 except that the 1—12 circuit is now established through limit switch LS–1, the cam 50 is returning the track switch to normal position, and the circuit through control relay CR–1 to the tripping coil of control relay CR–2 effectively completes such tripping circuit. When the track switch reaches normal position circuit 1—12 through limit switch LS–2 completes the tripping circuit to control relay CR–1 whereupon all circuits are returned to their normal condition.

If, upon contacting pulse section PS–1, the positive selective contact SS–1 is not closed, there is no effect upon control relay CR–1 and the monotractor proceeds through the track switch in normal position as previously indicated.

Push buttons PB–1 and PB–2 are provided at the track switch for local control and, when depressed, serve to complete the circuits to the closing and tripping coils of control relay CR–1 in the same manner as pulse sections PS–1 or PS–14 and limit switches LS–1 or LS–2, respectively, by-passing, however, the automatic control circuits.

EXIT SWITCH

Figure 13:
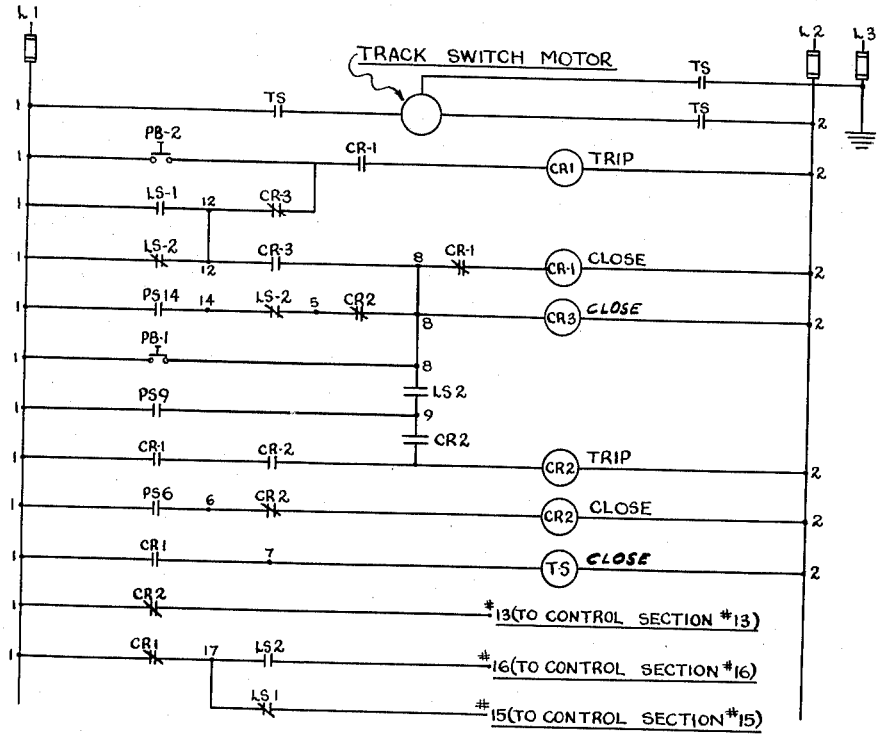
Fig. 13 is a schematic diagram for the exit track switch control circuit.

In Figs. 3 and 13 a schematic diagram of a standard exit switch and the control circuit for such switch are shown. The components in the control circuit for the exit switch are similar to those used in the entrance switch and their function may be explained by following a monotractor through the switch under three conditions: (a) where a monotractor approaches the switch along the main line; (b) where a monotractor approaches the switch along the branch line; (c) where two monotractors approach the switch simultaneously along both lines.

The main line control bar C–1 is provided with two control sections CS–13 and CS–15, two pulse sections PS–6 spaced a distance apart somewhat greater than the stopping distance of a de-energized driving unit, and a third pulse section PS–9. The branch line control bar C–1 is provided with two control sections CS–13 and CS–16 and two pulse sections PS–14 spaced in a like manner to pulse sections PS–6. Two limit switches LS–1 and LS–2 are provided in the track switch which are of similar construction to those used at the entrance switch except that limit switch LS–2 completes two individual circuits in each of its two positions instead of one.

As a monotractor approaches the exit switch along the main line, it passes through normally energized control section CS–13 and contacts pulse section PS–6 completing a circuit from L1 to L2 through pulse section PS–6 closing control relay CR–2 and reversing its contacts. This de-energizes control section 13 preventing the passage of a following monotractor through such section from either the main line or the branch line. As the monotractor proceeds, pulse section PS–6 is again contacted without effect and the monotractor proceeds through the switch whereupon it contacts pulse section PS–9. This completes a circuit from L1 to L2 through pulse section PS–9, the now closed CR–2 contact and the tripping coil of control relay CR–2, thereby tripping such relay and returning all circuits to normal condition.

The momentum of any branch line monotractor which may have been approaching pulse section PS–14 at the time control section CS–13 was deenergized will not be sufficient to carry it past the second pulse section PS–14. Therefore, when the main line monotractor has contacted pulse section PS–9 and control section CS–13 is re-energized, a monotractor on the branch line whose momentum may have carried it past the first pulse section PS–14 will now contact the second pulse section PS–14 completing a circuit from L1 to L2 through the closing coils of control relays CR–1 and CR–3, thereby closing such relays and reversing their contacts. This de-energizes control sections CS–15 and CS–16 and starts the track switch motor moving the switch toward branch position. The closing of control relay CR–3 operates to prevent the tripping of control relay CR–1 during the initial movement of the track switch and is maintained in closed position until the 1—12 contact of limit switch LS–2 is opened by a circuit passing through such contact.

As the track switch moves toward branch position, contacts 5—14 and 1—12 in limit switch LS–2 and contacts 15—17 in limit switch LS–1 are opened. The open contacts 15—17 in limit switch LS–1 add an additional open circuit to control section 15 which prevents such section from being re-energized until the track switch has returned to its normal position. The open contacts 5—14 through limit switch LS–2 prevent any accidental contact with pulse section PS–14 from closing control relay CR–1 until the track switch has returned to its normal position. The open circuit 1—12 through limit switch LS–2 de-energizes the closing coil of control relay CR–3 permitting the spring in such relay to trip it thereby returning the circuits through such relay to their normal position where the closing of circuit 1—12 through limit switch LS–1 will trip control relay CR–1. When the track switch has completed its movement to branch position, circuit 1—12 through limit switch LS–1 is closed thereby completing the circuit from L1 to L2 through limit switch LS–1 tripping control relay CR–1 and returning its contacts to their normal position. At the same time, circuits 8—9 and 16—17 through limit switch LS–2 are closed. At this moment the track switch motor is stopped by the open CR–1 contact in series with the contactor coil TS, and control section CS–16 is energized by the closed CR–1 and LS–2 contacts. The monotractor now proceeds to pass through the track switch whereupon it contacts pulse section PS–9. Such contact completes the circuit from L1 to L2 through pulse section PS–9, limit switch LS–2, control relay CR–1 and the closing coil of control relay CR–1 thereby closing such relay. At this time the control circuit functions in the same manner as upon the initial closing of control relay CR–1 except that the circuit 1—12 is now established through limit switch LS–1 and the direction of the travel of the track switch is reversed. When the track switch has reached its normal position, the circuit 1—12 through limit switch LS–2 is closed, thereby completing the circuit from L1 to L2 through the tripping coil of control relay CR–1. This trips such relay and returns all circuits to their normal position.

In the event two monotractors simultaneously approach the exit switch from main and branch lines, respectively, and contact pulse sections PS–6 and PS–14 at exactly the same time, both control relays CR–1 and CR–2 will be simultaneously closed reversing their contacts. This will result in the immediate tripping of control relay CR–2 by a circuit through the closed CR–1 and CR–2 contacts in series with the CR–2 tripping coil giving precedence to the monotractor approaching the exit switch along the branch line. Since the distance between the two pulse sections PS-6 is such that the momentum of the monotractor on the main line will not carry it through the second pulse section PS-6, such section will be contacted by the control shoe of the main line monotractor when control section CS-15 is re-energized upon the passage of the branch line monotractor through the switch and the return of the switch to normal position. This will result in control relay CR-2 again being closed and control section CS-13 being de-energized while the main line monotractor passes through the switch.

Thus, in effect, precedence between two monotractors approaching an exit switch from different lines is given to whichever is even slightly ahead of the other, but in the event that each contacts its respective pulse section at exactly the same time, precedence is then given to that monotractor approaching from the branch line.

It will be understood that any exit track switch could be normally retained, if desired, in a branch position and moved to main line position only upon the approach of a monotractor along the main line by a simple reversal of the control circuits and control sections for such switch, although in a majority of installations less frequent movement of the exit track switch will be required by normally retaining it in main line position.

STOPPING POINT

After a monotractor has passed through the proper entrance track switches leading it to a designated sub-branch track, as shown in Fig. 1, it remains for the monotractor to stop at one of the three stopping points in such sub-branch track. Here again, a selective signal is required to de-energize one of three control sections in the control conductor bar C-1 located at the three stopping points. In order to de-energize one of such three control sections in response to a selective signal, a pulse section is placed in front of each control section which operates in conjunction with a selective signal from a corresponding selector unit in the monotractor to give an electrical signal closing a control relay in a manner similar to the operation of such combination at an entrance switch.

Figure 14:
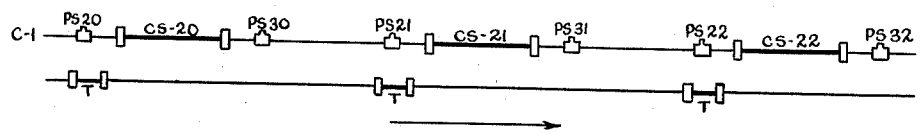
Fig. 14 is a schematic plan view of a typical sub-branch track with three stopping points.

A schematic diagram of a typical sub-branch track is shown in Fig. 14 where the three control sections are designated CS-20, CS-21 and CS-22. Pulse sections PS-20, PS-21 and PS-22 are located just to the left of each control section and are contacted by the control shoe 33 of a monotractor approaching from the left before each respective control section is entered. Pulse sections PS-30, PS-31 and PS-32 are located just to the right of each respective control section and operate to re-energize the control sections after the monotractor has passed through them.

Figure 15:
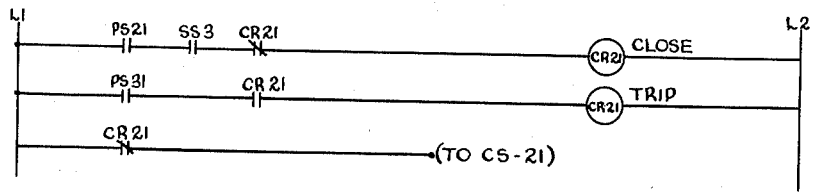
Fig. 15 is a schematic diagram of the control circuit for a typical stopping point.

Referring to the schematic diagram of the control circuit for one of the three stopping points shown in Fig. 15, the operation of such control circuit may be seen by following through a typical case. Assuming that the monotractor approaches from the left having its selector dial set for the second station represented by control section CS-21, the control shoe of the monotractor will first contact pulse section PS-20. In the absence of a closed selective signal contact SS-3, normally energized control section CS-20 will remain energized and the monotractor will proceed through such control section contacting pulse section PS-30 without effect. Upon contacting pulse section PS-21, a circuit from power conductor L-1 to L-2 will be completed through pulse section PS-21, the selective signal contact SS-3, and the closing coil of control relay CR-21 thereby closing such relay, reversing its contacts, and thus de-energizing control section CS-21. The monotractor will thereupon be stopped as it enters such control section.

When it is desired to again start the monotractor to proceed to a new destination, the "inch" stop push button 43 on the monotractor is depressed by a local operator who may then move the monotractor out of control section CS-21 by depressing the forward push button 46 (see Figs. 4 and 8). This energizes the monotractor motor by a circuit passing from power conductor L-1 to L-2 through such motor and when the monotractor has passed out of control section CS-21, its control shoe 33 contacts pulse section PS-31. The normally open CR-21 contact in series with the tripping coil of control relay CR-21 having been closed upon the closing of the relay CR-21, the closed circuit through pulse section PS-31 operates to trip the control relay CR-21 returning the circuit to its normal condition thereby re-energizing control section CS-21. The monotractor then proceeds through control section CS-22 and to an exit track switch such as heretofore described.

SELECTIVE SIGNAL MEANS

(a) Balance resistance bridge

Two alternative selective signal systems have been developed for use in the present conveyor system, one of which utilizes a balanced resistance bridge means and the other a stepping relay selective means.

Figure 16:
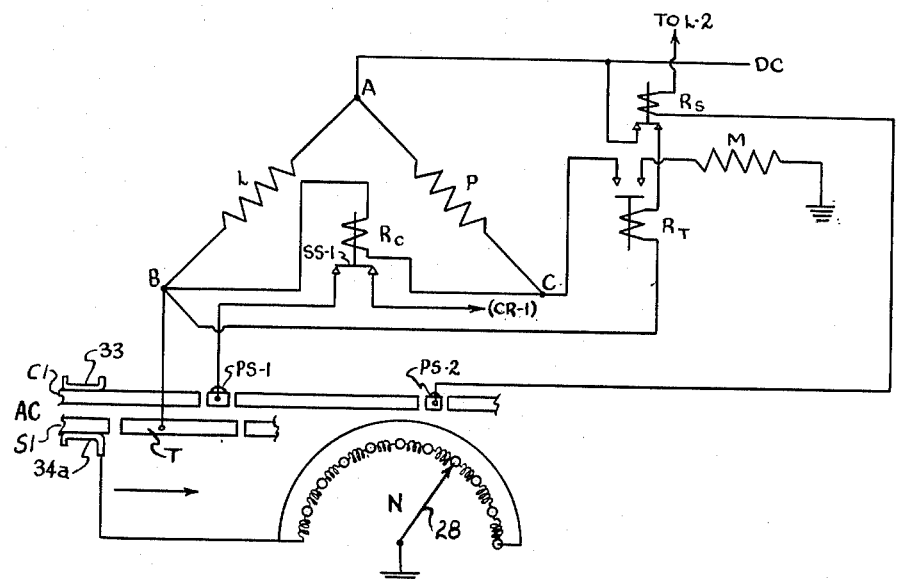
Fig. 16 (Sheet 4) is a schematic diagram of the electric resistance selective signal unit used in the signal system.

Referring to Fig. 16, a schematic diagram of the balanced resistance bridge selective signal unit is shown. The basic function of this unit is to provide a variable selective signal control whereby a given setting on an approaching monotractor will cause a particular entrance track switch to move from its normal to its branch position, and, in the case of selecting stopping points, will cause a particular control section in the track to be de-energized. In the present instance there are entrance track switches from a main line to ten branch lines and from each branch line to ten sub-branch lines. Each sub-branch line has three stopping points. Accordingly, three selective signal units are used on each monotractor, two of which have ten settings each and one of which has three settings.

As indicated above, the selective signal unit operates to complete a circuit passing through a pulse section and closing a relay which starts a track switch motor or de-energizes a control section in the track as the case may be. In order to provide the necessary selectivity a balanced bridge principle is utilized in the selective signal unit wherein three fixed resistance legs of the bridge are located at each track switch or stopping point in the conveyor line and the fourth variable resistance leg is located on the monotractor and controlled by a selector dial thereon. By providing the three fixed resistance legs at each track switch or station with different values corresponding to a balanced bridge condition for one particular setting of the variable resistance leg on the monotractor and by utilizing the voltage potential that exists across the bridge for all unbalanced conditions of the bridge to open a normally closed selector circuit, such circuit will remain closed only when a balanced condition of the bridge exists.

In Fig. 16 the three fixed resistance legs are designated as L, P and M, one end of the latter resistance being connected to ground. The variable resistance leg N comprises ten fixed resistances in series. Rotation of the dial contactor 28 from left to right progressively adds a new resistance for each new position reached. One end of the dial contactor 28 is also connected to ground. Since the ground potential is the same in each case, a parallel bridge effect is accomplished without connecting the leads of resistances M and N to a common conductor. A normally closed circuit passes from the pulse section PS-1 in the control bar C-1 through the contacts SS-1 of relay R-c and then to the control relay CR-1 which operates the track switch motor, as shown in Fig. 11. Any appreciable difference of potential between points B and C across the bridge energizes relay R-c opening the circuit from pulse section PS-1 to control relay CR-1 so that the circuit through the contact SS-1 of relay R-c remains closed only when the bridge is in a substantially balanced condition. In the present instance a 220 volt alternating current is carried in the power conductor bars L-1 and L-2 and a 350 volt direct current, derived from a transformer and rectifier having an input from the alternating current conductor bars L-1 and L-2, is applied to point A. At any time prior to establishing contact between the monotractor control shoe 33 and the pulse section PS-1 or between the monotractor selector shoe 34a and the insulated selector section T, there are no closed circuits from the D. C. power supply to ground and none of the relays R-c, R-s or R-t are energized. Each relay is shown in its non-energized normal position with the R-c and R-s contacts closed and the R-t contacts open. The selector shoe 34a is positioned to contact the selector section T slightly before the control shoe 33 contacts pulse section PS-1. At the moment selector section T is contacted by selector shoe 34a, a circuit passes from the D. C. power supply to ground through the contacts of relay R-s, the coil of relay R-t, point B, selector section T, and resistance N, thus energizing relay R-t and closing the contacts between point C and resistance M. At the same time a circuit passes from point A to ground through resistance L, point B, selector section T and resistance N, and another circuit passes from point A to ground through resistance P, point C, the contacts of relay R-t, and resistance M. If the bridge is in balanced condition, points B and C will be at an equal potential and no current will flow between these points to energize relay R-c so that when control shoe 33 contacts pulse section PS-1 a closed circuit from power bar L-1 to L-2 will be established through the control bar C-1, the control shoe 33, pulse section PS-1, the contacts SS-1 of relay R-c and the closing coil of control relay CR-1. If, on the other hand, the bridge is unbalanced, a difference in potential between points B and C will result causing a current to energize relay R-c opening the contacts SS-1 and preventing the aforementioned circuit from being established.

While the initial circuit energizing relay R-t can only be established by a circuit passing through selector section T and resistance N, once the contacts of relay R-t are closed a circuit passing from the D. C. line to ground through the energizing coil of relay R-t, point B, the energizing coil of R-c, point C, contacts of relay R-t, and resistance M, would continue to energize relay R-t after selector shoe 34a passed insulated section T if such circuit were permitted to remain closed. An auxiliary spring return relay R-s with normally closed contacts is therefore placed in such circuit and energized by a momentarily closed circuit from L-1 to L-2 through pulse section PS-2 placed in the control bar C-1 a short distance past pulse section PS-1, thus interrupting the circuit to the coil of relay R-t and permitting its contact to re-open.

Figure 17:
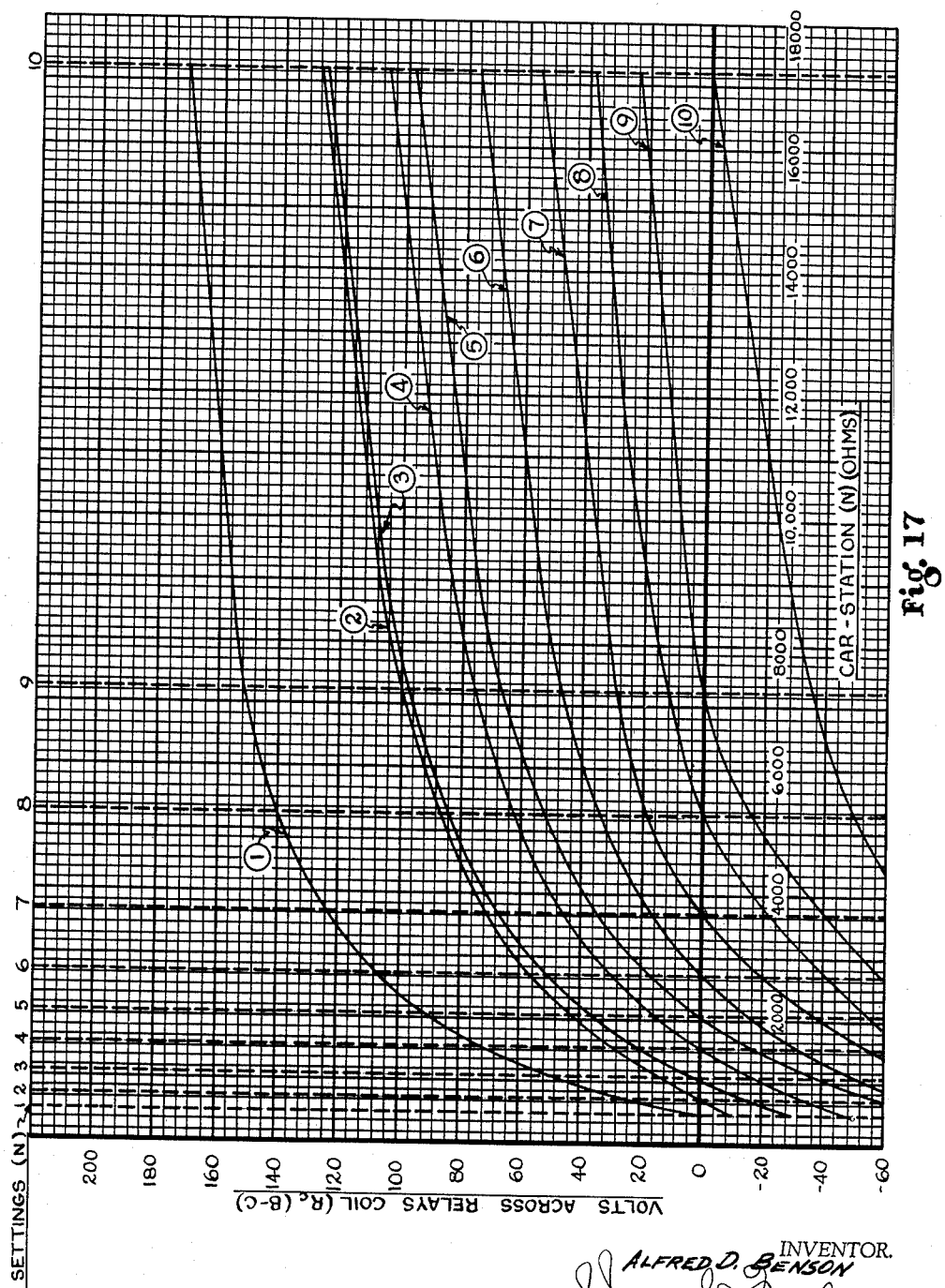
Fig. 17 is a graph showing typical control voltage curves for the selective signal unit.

In Fig. 17 a typical actual set of voltage curves for a ten setting selective signal unit is shown. The horizontal coordinate represents the effective resistance in ohms of variable resistance N. The vertical coordinate represents volts across the coil of relay R-c. Vertical lines designated Settings (N) 1 through 10 indicate the effective resistance of N for each of ten settings, and curves numbered 1 through 10, showing the voltage across the coil of relay R-c for the various values of resistance M used at the different track switches for each of such settings, indicate the volts available to energize relay R-c at settings adjacent to the balanced setting for each respective track switch. For example, at track switch number 7, setting number 7 with an effective resistance N of approximately 3800 ohms results in a balanced bridge with zero volts across points B and C. Setting number 6 with an effective resistance N of approximately 2750 ohms results in a negative voltage between points B and C at switch number 7 of approximately 20 volts. Setting number 8 with an effective resistance N of approximately 6000 ohms results in a positive voltage between points B and C at switch number 7 of approximately 18 volts.

As indicated in Figs. 4 and 7, selector shoes 34a, 34b and 34c are spaced longitudinally with respect to each other and are likewise each located in a different longitudinal relationship with control shoe 33. The relative spacing of pulse section PS-1 and selector section T, shown in Fig. 16, is effective only for selector shoe 34a since the control shoe 33 will be past pulse section PS-1 when selector shoes 34b and 34c, respectively, contact selector section T. Since the selector dial shown in Fig. 16 connected to selector shoe 34a represents selection of main line-branch line entrance track switches, this relative spacing of pulse section PS-1 and selector section T is maintained for each signal point in such group of switches. The pulse sections corresponding to PS-1 and used at branch-sub-branch entrance switches and at stopping points in the sub-branch lines will be spaced relatively farther longitudinally from their respective selector sections corresponding to T in order to be effective for the other selector shoes 34b and 34c and their corresponding dials.

(b) Stepping relay

Figure 24:
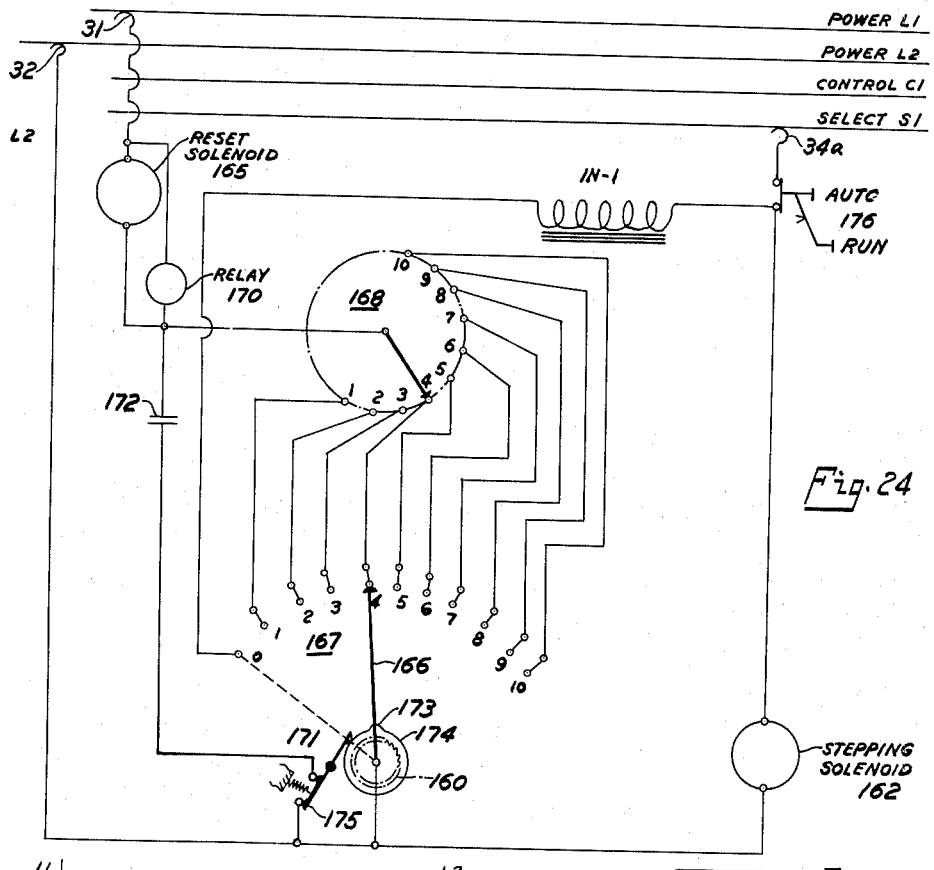
Fig. 24 is a schematic diagram of an alternative selective signal unit utilizing a stepping relay for selective purposes.
Figure 26:
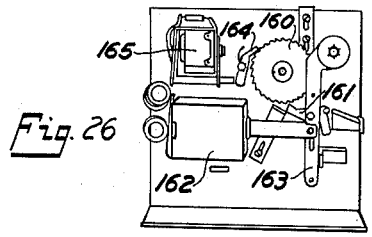
Fig. 26 is a somewhat perspective view of a stepping relay showing the electrical-mechanical arrangement for effecting a step by step movement and for resetting the relay.
Figure 25:
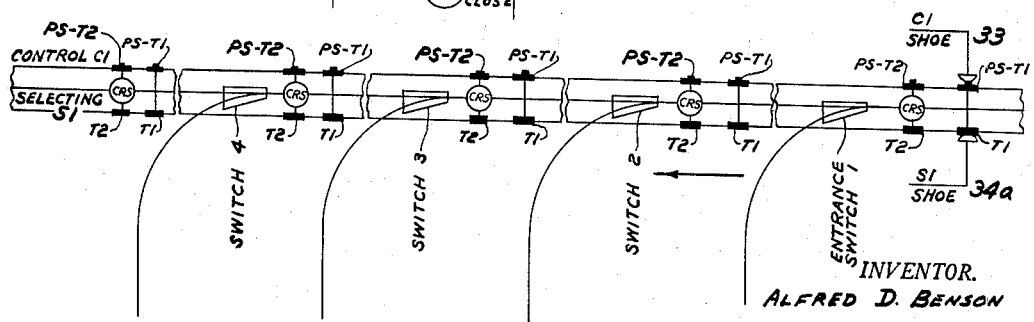
Fig. 25 is a schematic plan view of a portion of the conveyor layout shown in Fig. 1 including the first four main line-branch line junctures together with pulse and signal sections used in conjunction with the stepping relay signal system.

The selective signal system shown in Figs. 24, 25 and 26 utilizes a stepping relay for selective purposes. In general, the relay carried by the monotractor has a number of steps equal to the number of points within a group from which a single selection must be made. A dial on the relay is set to the step corresponding to the point at which a selective signal is required. As the monotractor passes each signaling point, an electrical impulse moves the relay forward one step. When a number of steps have been taken corresponding to the number set on the dial, a positive signal is given.

Specifically, the stepping relay shown in Fig. 26 has a ratchet wheel 160 which is moved against a torsion spring by a pawl 161 each time the solenoid 162 is energized by an electrical impulse moving the lever 163 to the left as shown in Fig. 26. A second pawl 164 engages the ratchet wheel 160 preventing backward movement until the solenoid 165 is energized moving the pawl 164 out of locking position and permitting the torsion spring to return the ratchet wheel 160 to its zero position.

Referring now to Fig. 24 schematically showing the electrical circuit in the relay, it may be seen that the ratchet wheel 160 is connected to a contact finger 166 which progressively moves with the ratchet wheel 160 to contact the various points numbered one through ten on the contact disc 167. A selector dial 168 having an equal number of contact points may be manually set to any desired point. Each of the contact points on the dial 168 is connected to a corresponding contact point on the disc 167 and an electrical circuit between the dial 168 and disc 167 is accordingly established when the contact finger 166 reaches the pre-selected contact point.

Figure 27:
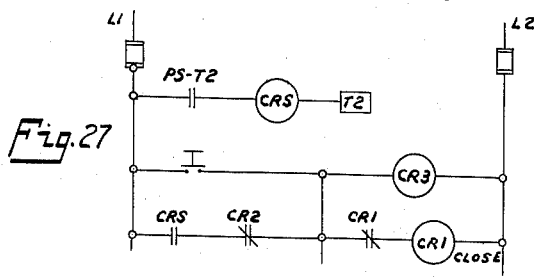
Fig. 27 is a schematic diagram showing a portion of the control circuit for the entrance track switch, shown in Fig. 11, modified to incorporate the use of the stepping relay signal system.

Utilizing the same collector shoe arrangement as shown in Figs. 4, 6 and 7, a circuit passing from the selector shoe 34a to the power shoe 32 (supplied with L-2 power phase) through the stepping solenoid 162 is established whenever the selector shoe 34a contacts a section in the selector bar S-1 energized with L-1 power phase. As shown in Fig. 25, this may be accomplished by connecting an insulated section T-1 in the selector bar S-1 to a pulse section PS-T1 in the control bar C-1 in front of each main to branch line entrance switch. Thus, as a control shoe 33 passes over a pulse section PS-T1, power of L-1 phase is supplied to the section T-1 and the contact finger 166 is advanced one step. An insulated external signal section T-2 which is located in the selector bar S-1 beyond each insulated section T-1 is connected in series with a signal relay CRS and with a second pulse section PS-T2 located opposite section T-2 in the control bar C-1. As shown in Fig. 27, a normally open contact of control relay CRS in series with the closing coil of control relay CR-1, which controls the movement of the entrance track switch (see Fig. 11), is closed when an energizing circuit through signal relay CRS is established, thus closing control relay CR–1 and starting the track switch to move to branch position. The signal circuit shown in Fig. 27 may be substituted for the first two lines of the schematic diagram of the control circuit for the entrance track switch shown in Fig. 11, the remainder of the control circuit used with the stepping relay signal system being identical in all respects. If the section T–2 is supplied with power of L–2 phase by the selector shoe 34a as it contacts such section and as control shoe 33 contacts pulse section PS–T2, the entrance track switch will be moved to branch position in the manner indicated above. If the section T–2 is not so energized, the monotractor will proceed through the switch in main line position.

In passing over a section T–2, the selector shoe 34a is energized with L–2 phase when the contact finger 166 is in zero position by a circuit passing from the power shoe 32 through the contact finger 166, the zero contact point, and an iron core inductor IN–1 having a relatively low impedance. For all other positions of the contact finger 166 section T–2 is not so energized, the resistance of the series circuit through the stepping solenoid 162 and the signal relay CRS being sufficiently high to prevent either from being energized.

If the selector dial is set at point number 4, as shown in Fig. 24, a monotractor will proceed through the first three entrance track switches without giving a positive signal, the contact finger 166 progressively advancing to contact point number 3 as previously described. Upon contacting the next section T–1 and pulse section PS–T1 the contact finger 166 moves to point 4 thereupon establishing a circuit through the reset solenoid 165 passing from power conductor shoe 31 through such solenoid, point 4 of the selector dial 168, point 4 of the contact dial 167, the contact finger 166 to the power shoe 32, thereby resetting the contact finger 166 to zero position. Upon contacting simultaneously the next section T–2 and pulse section PS–T2, signal relay CRS is energized causing the track switch to move the branch position.

Relay 170 and the limit switch 171 are provided to maintain the reset circuit until the contact finger has returned to zero position. As soon as the reset circuit is established, relay 170 is energized closing its normally open contact 172. A circuit for maintaining solenoid 165 and relay 170 in an energized condition is thereupon established through contact 172 and the closed contact 175 of limit switch 171, the latter contact being opened by the high point 173 of cam 174, which rotates with the contact finger 166, when the contact finger reaches the zero contact.

The inductor IN–1 is provided to prevent a momentary short circuit through the zero contact when the first step is taken. While the impedance of this inductor is sufficient to prevent a short circuit, it is low enough to permit the signal relay CRS to be energized when such energizing circuit is established through the inductor. As previously noted, the combined resistance of the stepping solenoid 162 and the signal relay CRS, which are in a series circuit each time the control shoe 33 and signal shoe 34a contact a pulse section PS–T2 and signal section T–2, is sufficiently high to prevent the energizing of either the solenoid or the relay. Thus, no extra step will be taken, and no signal will be given upon such contact unless the contact finger 166 is at zero position.

Additional stepping relay signal units may be provided to signal for branch to sub-branch switches as well as for selective stopping on the sub-branch line. In these cases the spacing of the pulse sections PS–T1 and PS–T2 in the control conductor bar C–1 relative to sections T–1 and T–2 in the signal bar S–1 will be such as to cause them to be simultaneously contacted by the control shoe 33 and signal shoe 34b or 34c, respectively, in a manner similar to the electric resistance selective signaling system. Such spacing will prevent the signal unit for one group of signal points from being affected or effective in passing either of the other two groups of signal points. In order to prevent a stepping relay associated with stopping points from continuing to step or from giving further stopping signals after a monotractor has reached its destination and is returning to the main line, a push button switch 176 is provided with "automatic" and "run" positions. When a monotractor is started up from a stopping point, the "run" button is depressed opening the circuit to the signal shoe associated with such stopping points.

It is to be noted that if only one group of signal points from which a single selection must be made is used in a conveyor system, the second pulse section PS–T2 may be omitted from the signal system and the corresponding side of signal relay CRS connected directly to a constant L–1 power source, the function of such pulse section being merely to differentiate between two or more groups of signal points.

It is recognized that other selective signaling means could be used in connection with the entrance track switch and stopping point control circuits described above.

ALTERNATIVE POWER SYSTEMS

Figure 28:
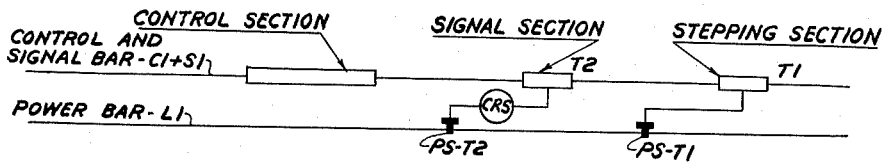
Fig. 28 is a schematic plan view of a portion of a modified conveyor line showing the use of a two conductor bar system with power and pulse sections carried by one conductor bar and control and signal sections located in the other.
Figure 29:
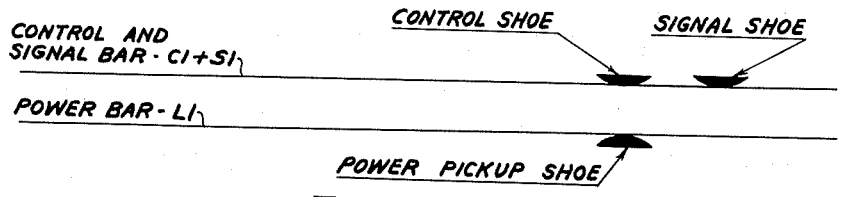
Fig. 29 is a schematic plan view of the arrangement of power, control and signal shoes adapted to the modified system shown in Fig. 28.
Figure 30:
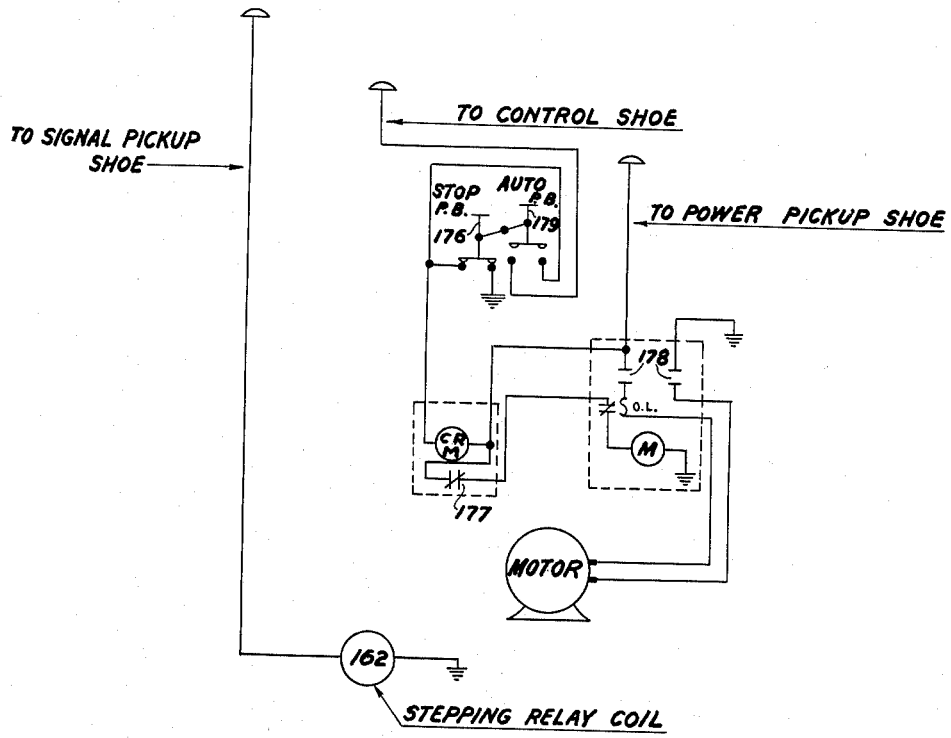
Fig. 30 is a schematic diagram of the driving unit control circuit adapted for use in the two conductor bar system.

As will be apparent from an examination of Figs. 28, 29 and 30, the stepping relay signal system and the entire control system previously described may be adapted to a two conductor bar A. C. or D. C. system. In such system power, designated as L–1, which may be single phase A. C. or D. C., and all pulse sections designated by prefix PS for both signal and other control purposes, are carried by one of the two conductor bars. All control sections, designated by CS, and all stepping or signal sections T–1 or T–2 are located in the other normally de-energized conductor bar.

Instead of the arrangement of power, control and signal shoes shown in Figs. 6 and 7, a single power pickup shoe is used, and longitudinally spaced control and signal shoes contact the control and signal bar, as indicated in Fig. 29.

The control sections in such modified system are normally deenergized but will operate to stop the monotractor when they are energized by a grounded circuit. Thus in the control circuit for the monotractor shown in Fig. 30, when the stop push button 176 is depressed a circuit from the power pickup shoe to ground is established energizing a control relay CRM opening a normally closed contact 177 of such relay thereby opening a circuit from the power pickup shoe through the coil M of the line starter for the monotractor motor. The contacts 178 of such line starter are thereby opened interrupting power to the single phase A. C. or D. C. motor.

When the automatic push button 179 is depressed, the energizing circuit through control relay CRM is normally interrupted closing the contact 177, energizing the circuit to line starter M, thereby causing the contacts 178 to close and the monotractor to start up.

The schematic diagrams shown in Figs. 11, 12, 13 or 15 may be adapted to such modified control system by eliminating phase L–3, consideraing L–2 as a grounded connection, and substituting the energizing coil of an additional spring return relay in place of each of the indicated control sections, completing the circuits from such energizing coils to L–2. By then showing each of the control sections in a new circuit connected to L–2 with a normally closed contact of each added relay interposed between its corresponding control section and L–2, it will be apparent that as soon as a circuit to any of such energizing coils is opened, its control section will be energized by a connection to ground and an approaching monotractor will be stopped. As an example, the control circuit for an entrance switch shown in Fig. 11 is shown in the modified form in Fig. 11a with additional relays CR–x and CR–y for controlling respectively control sections CS–3 and CS–4.

POWER COLLECTOR

Figure 18:
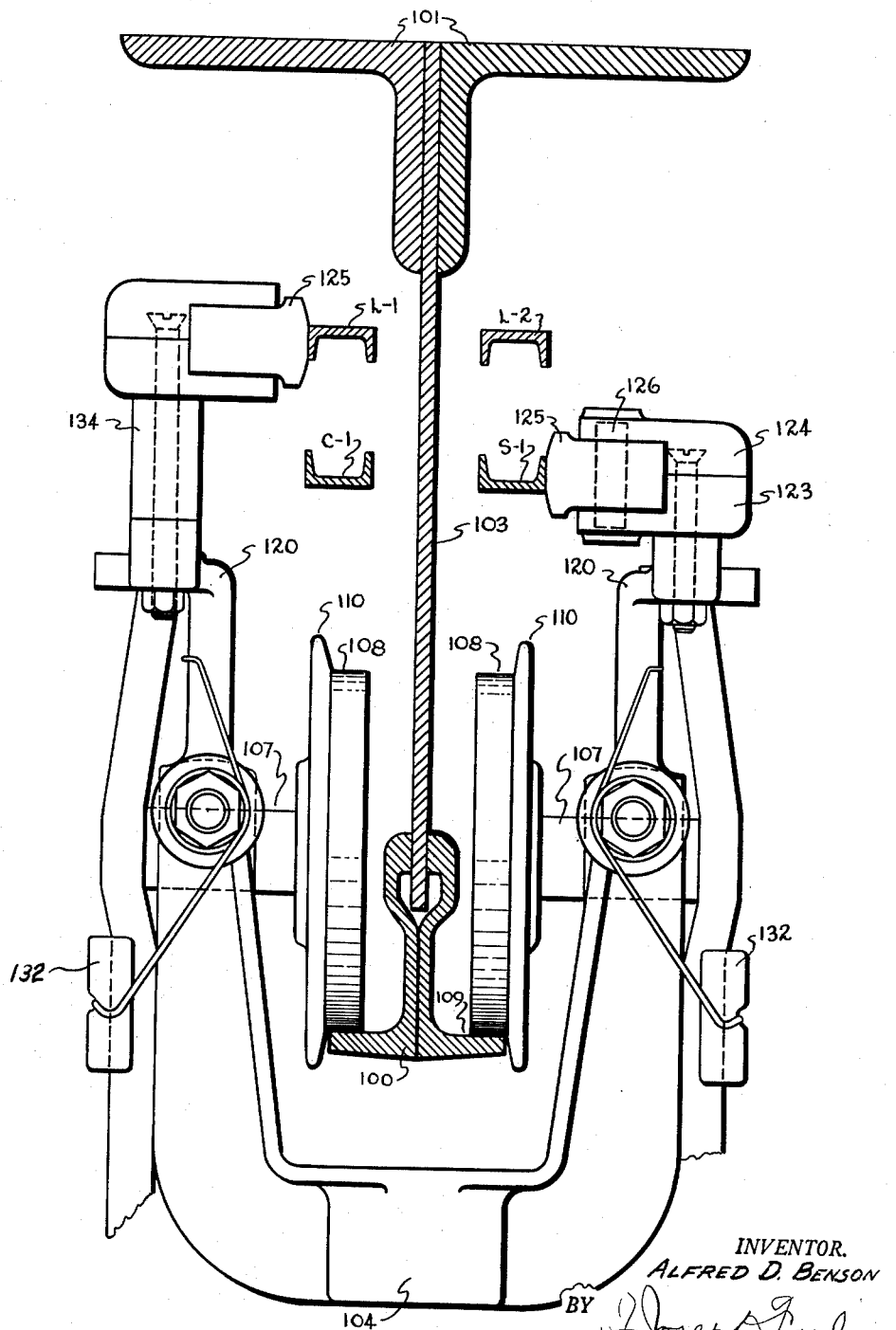
Fig. 18 is a layout end elevation of a trolley bracket with power collectors.
Figure 20:
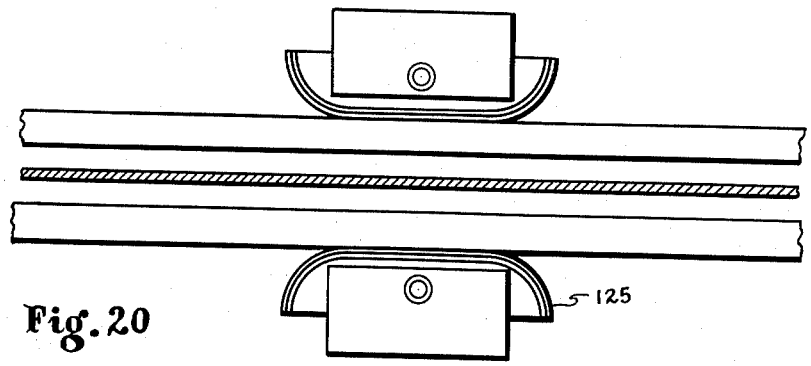
Fig. 20 is a plan view of the collector shoes shown in Figs. 18 and 19 in contact with their respective conductor bars.
Figure 19:
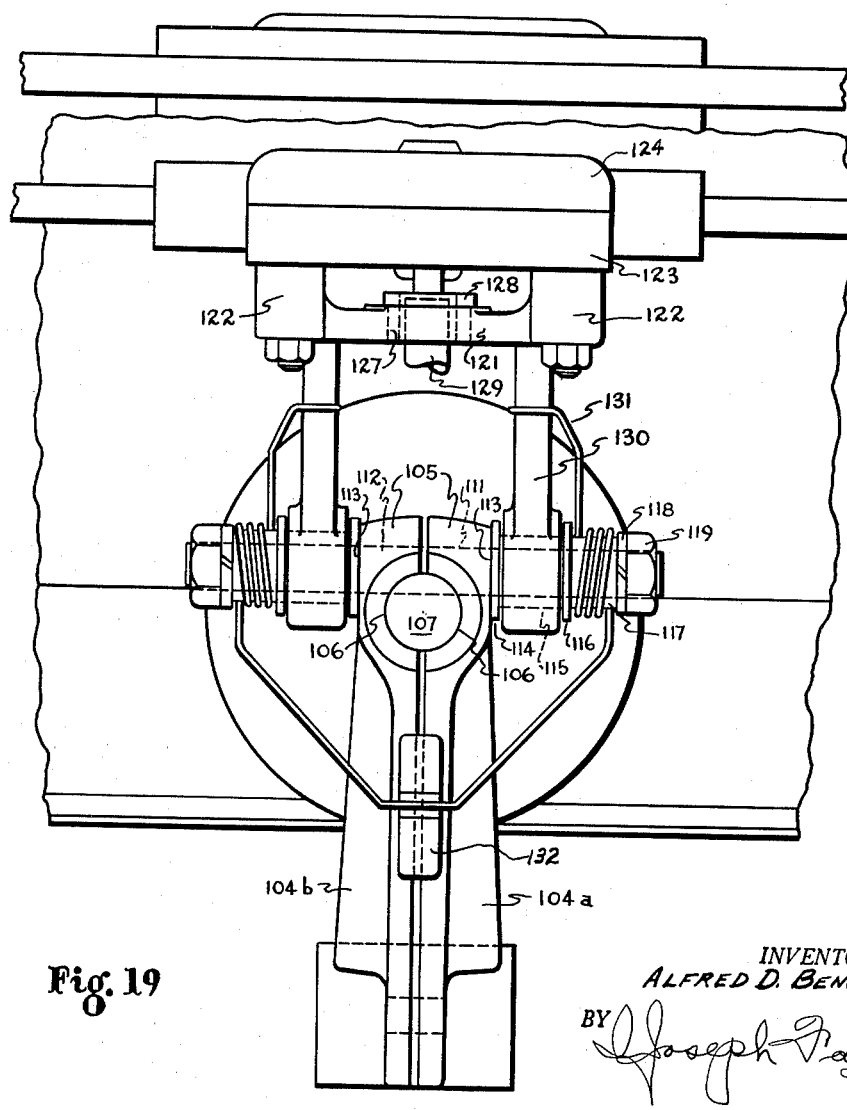
Fig. 19 is a layout side elevation of a trolley bracket with power collectors.

In Figures 18, 19 and 20 the detailed construction of a typical power collector is shown. The conveyor track 100 is suspended from girder rails 101 by a vertical plate 103. A trolley bracket 104 formed in two transversely separated halves 104a and 104b has two upper ends 105 each of which has a semi-cylindrical opening 106. When assembled together in opposed relationship, such semi-cylindrical openings form the journal for two cylindrical shafts 107 on the inner end of which the inner race of a ball bearing type trolley wheel 108 is attached. The trolley wheels 108 ride on the upper surface 109 of the conveyor track 100 and each of the wheels 108 is provided with a flange 110 to keep the wheels in centered running position on the track. Parallel to the direction of travel and on an axis somewhat above the axis of the trolley wheel shaft 107, a cylindrical recess 111 is provided though the upper ends 105 of the bracket member. The cylindrical recess 111 forms a journal for a shaft 112 extending through the upper ends 105 of the bracket member on either side. A notch in the trolley wheel shaft 107 provides clearance for the shaft 112 and permits such latter shaft to act as a key locking the shaft 107 against rotation.

Assembled on each extension of the shaft 112 which is threaded at each of its outer ends are the following members starting outwardly from the outer edges 113 of the upper end 105 of the bracket member: A washer member 114, a spacer tube 115, a washer 116, another spacer tube 117, a lock washer 118 and a nut 119. Rotatably mounted on the first spacer tube 115 are the arms 130 of an upper bracket member which connect at their upper ends 120 to a longitudinal portion 121 of such upper bracket member. Secured to the outer ends 122 of the longitudinal extension 121 of the upper bracket member are a lower insulator 123 and upper insulator 124, a collector shoe 125 being secured between the insulators 123 and 124 by means of a hinge pin 126. Located centrally in the longitudinal extension 121 is a cylindrical recess 127 which forms the housing for a tubular insulator 128 through which an insulated lead wire 129 may pass. Such lead wire is connected at its upper end to the hinge pin 126 in a manner establishing a circuit from the shoe 125. A single wire spring 131 is formed to seat against the arms 130, coil around the spacer tubes 117 and pass over a block member 132. Such spring is mounted under torsion such as will urge the arms 130 of the upper bracket member inwardly causing the collector shoes 125 to bear against the conductor bars S-1 and L-1 which are mounted to the vertical plate 103 by insulating means not shown. Each block member 132 is provided with a vertical extending groove enabling it to fit over the lead wire 129 which passes downward between such block and the bracket member 104, thus protecting such lead wire from the cutting action of the spring wire 131 while permitting the spring to hold the lead wire firmly against the bracket member 104. In order to provide vertical spacing necessary to permit the collector shoe 125 to ride against an upper bar (L-1 or L-2), a tubular spacer 134 is interposed between the outer ends 122 of the conductor bracket member and the insulator 123.

PULSE SECTION

Figure 21:
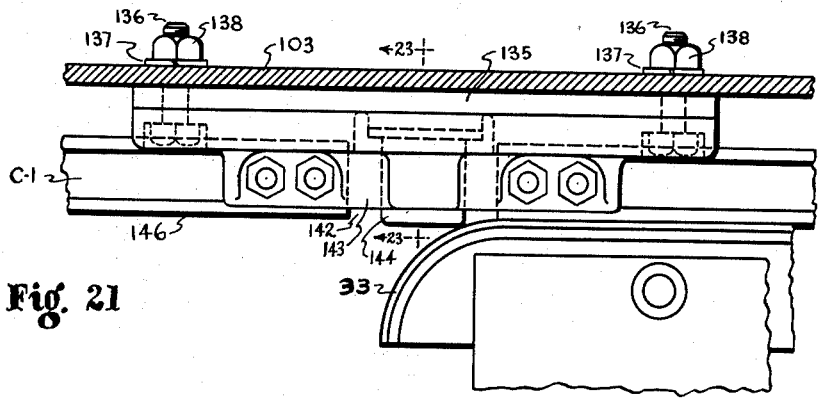
Fig. 21 is a plan view of the detailed construction of a pulse section.
Figure 22:
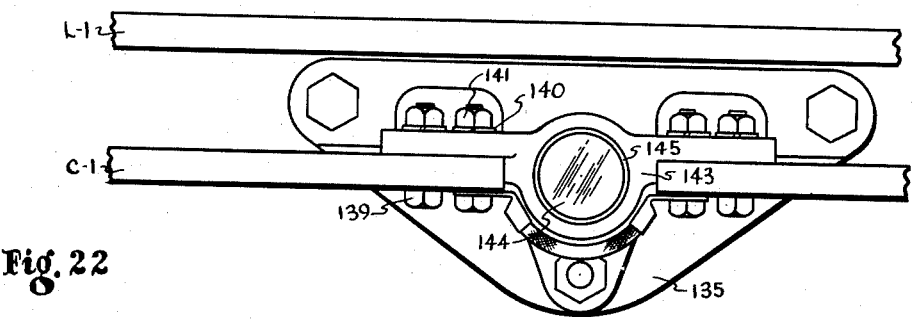
Fig. 22 is a side elevation of the pulse section shown in Fig. 21.
Figure 23:
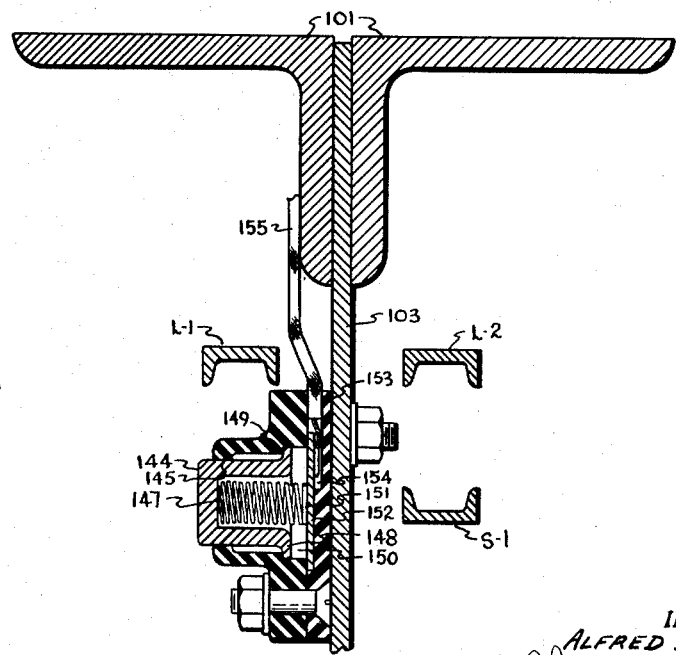
Fig. 23 is a sectional end elevation of the pulse section taken along the line 23—23 of Fig. 21.

Referring to Figs. 21, 22 and 23, the detailed construction of a typical pulse section is shown in its relative position to the girder rails 101, vertical plate 103, conductor bars L-1, L-2, S-1 and C-1 and control shoe 33. The insulating body 135 and insulating pad 153 are bolted to the vertical plate 103 by means of two bolts 136, lock washers 137 and nuts 138. The insulating body is also attached to the control rail C-1 by means of four bolts 139, lock washers 140 and nuts 141. Extending within an open section 142 in the conductor rail C-1 a portion 143 of the body 135 of the pulse section forms the housing for an electrically conducting contact button 144 which projects through a circular aperture 145 in the housing 143 somewhat beyond the line of the outside surface 146 of the conductor rail C-1. A compression spring 147 which also serves as a conducting terminal urges the contact button 144 outwardly and a flange 148 at the inner end of the contact button 144 formed to seat against a shoulder 149 in the insulating body 135 limits the outward movement of the contact button 144. A cylindrical recess 150 within the body 135 permits the inward movement of the contact button 144 against the force of the compression spring 147. The inner end 151 of the spring 147 seats against a conducting member 152 which is located within a recess in the insulator pad 153 and a groove 154 and the insulator pad 153 permits an insulated lead wire 155 to be introduced, the conducting wire of which is attached to the conducting member 152.

By this means the control shoe 33 which is energized through its contact with the control rail C-1 momentarily energizes the contact button 144 and lead wire 155 as the control shoe 33 passes over the contact button 144. The yieldable spring construction insures a positive continuous energizing circuit from the moment the control shoe 33 contacts the button 144 until it passes completely over it notwithstanding commercial irregularities in the shoe, control bar or button.

It will be understood that the contact button 144 need not itself be a conducting member but might instead be a contact member for depressing a limit switch having a normally open contact closed by such depression, and any claims referring to such conducting member are intended to comprehend such alternative method of deriving a momentary pulse.

Thus, it is seen that a conveyor system is provided by the present invention which meets each of the objects stated hereinbefore.

While illustrative embodiments of the invention have been described in detail, it will be readily understood that many variations are possible without departing from the spirit of my invention as disclosed in the following claims.

I claim:

1. In a conveyor system having a main line, one or more branch lines, each of said branch lines being connected to said main line by a two position entrance track switch, a continuous power supply along said main and each of said branch lines, one or more self-propelled electrically powered driving units, said driving units having a plurality of possible destinations within said conveyor system any one of which may be reached by passing through one or more of said entrance track switches; means for causing each entrance track switch through which a driving unit must pass in order to reach a predetermined destination to be in a position leading to said destination comprising a track switch motor, driving means between said motor and said track switch for alternately moving said track switch to each of its operative positions, a mechanically held two position relay for controlling the energizing circuit for said motor, a circuit for closing said relay and causing said motor to be energized moving said track switch to branch position in response to a selective electrical signal initiated by an approaching driving unit, a circuit for tripping said relay and causing said motor to be stopped in response to completion of said track switch's movement to branch position, a circuit for closing said relay and causing said motor to be energized moving said track switch to main line position in response to the passing of a point in said branch line by a driving unit, and a circuit for tripping said relay and causing said motor to be stopped in response to completion of said track switch's return to main line position.

2. In the control circuit for an entrance track switch recited in claim 1 wherein the power supply is carried by one or more conductor bars and wherein one or more collector shoes are located on each of said driving units to contact said conductor bars, an insulated conducting member located in one of said energized conductor bars at the mentioned point in said branch line and positioned to be contacted by a collector shoe while said collector shoe is simultaneously contacting said energized conductor bar, said insulated conducting member when so contacted serving to energize the second-mentioned closing circuit for said relay.

3. In a conveyor system having a main line, one or more branch lines, each of said branch lines being connected to said main line by a two position entrance track switch, a continuous power supply along said main and each of said branch lines, one or more self-propelled electrically powered driving units, said driving units having a plurality of possible destinations within said conveyor system any one of which may be reached by passing through one or more of said entrance track switches; means for causing each entrance track switch through which a driving unit must pass in order to reach a predetermined destination to be in a position leading to said destination comprising a track switch motor, driving means between said motor and said track switch for alternately moving said track switch to each of its operative positions, a mechanically held two position relay for controlling the energizing circuit for said motor, a circuit for closing said relay and causing said motor to be energized moving said track switch to branch position in response to a selective electrical signal initiated by an approaching driving unit, a limit switch actuated by the completion of said track switch's movement to branch position, a circuit for tripping said relay and causing said motor to be stopped, said tripping circuit being closed by the actuation of said limit switch, a circuit for closing said relay and causing said motor to be energized moving said track switch to main line position in response to the passing of a point in said branch line by a driving unit, a limit switch actuated by the completion of said track switch's return to main line position, a circuit for tripping said relay and causing said motor to be stopped, said latter tripping circuit being closed by the actuation of said latter limit switch.

4. In the control circuit for an entrance track switch recited in claim 3, an auixiliary spring return relay energized by said closing circuits, and maintained by a circuit responsive to the actuation of either of said limit switches, said auxiliary relay having contacts interposed in said tripping and auxiliary relay energizing circuits in a manner whereby each of said tripping circuits will be effective to stop said motor only upon the completion of the track switch's movement to either operative position.

5. In a conveyor system having a main line, one or more branch lines, each of said branch lines being provided with a two position entrance track switch leading from said main line to said branch line and with a two position exit track switch leading back to said main line, a continuous power supply along said main and each of said branch lines, one or more self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; means for causing each exit track switch through which a driving unit may pass to be in a proper receiving position comprising a track switch motor, driving means between said motor and said track switch for alternately moving said track switch to each of its operative positions, a mechanically held two position relay for controlling the energizing circuit for said motor, a circuit for closing said relay and causing said motor to be energized moving said track switch from its normal to its other operative position in response to an approaching driving unit's passing of a point in the line corresponding to said other operative position, a circuit for tripping said relay and causing said motor to be stopped in response to completion of said track switch's movement to said other operative position, a circuit for closing said relay and causing said motor to be energized moving said track switch back to its normal position in response to said driving unit's passing of a point beyond said track switch, and a circuit for tripping said relay and causing said motor to be stopped in response to completion of said track switch's return to its normal position.

6. In the control circuit for an entrance track switch recited in claim 5 wherein the power supply is carried by one or more conductor bars and wherein one or more collector shoes are located on each of said driving units to contact said conductor bars, an insulated conducting member located in one of said energized conductor bars at each of the mentioned points in the conveyor line and positioned to be contacted by a collector shoe while said collector shoe is simultaneously contacting said energized conductor bar, said insulated conducting members when so contacted serving to energize, respectively, the said closing and tripping circuits for said relay.

7. In a conveyor system such as recited in claim 5 wherein each of said driving units has a driving motor and a motor contactor for controlling the power supply to said motor, means for stopping a driving unit's approach to an exit track switch from either direction while said exit track switch is in motion comprising a control conductor bar mounted along each of the lines leading to said exit track switch, a collector shoe located on each of said driving units for contacting either of said conductor bars, an insulated section in each of said conductor bars before each exit track switch, an energizing circuit for each of said insulated sections of conductor bar controlled by said relay, an energizing circuit for each of said motor contactors controlled by either of said insulated sections of conductor bar, said energizing circuits being combined in a manner whereby the closing of said relay will interrupt the energizing circuit to the motor contactor of said approaching driving unit and in a manner whereby the energizing circuit to said motor contactor may not be re-established until said relay is tripped.

8. In a conveyor system having a main line, one or more branch lines, each of said branch lines being provided with a two position entrance track switch leading from said main line to said branch line and with a two position exit track switch leading back to said main line, a continuous power supply along said main and each of said branch lines, one or more self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; means for causing each exit track switch through which a driving unit may pass to be in a proper receiving position comprising a track switch motor, driving means between said motor and said track switch for alternately moving said track switch to each of its operative positions, a mechanically held two position relay for controlling the energizing circuit for said motor, a circuit for closing said relay and causing said motor to be energized moving said track switch from its normal to its other operative position in response to an approaching driving unit's passing of a point in the line corresponding to said other operative position, a limit switch actuated by the completion of said track switch's movement to said other operative position, a circuit for tripping said relay and causing said motor to be stopped, said tripping circuit being closed by the actuation of said limit switch, a circuit for closing said relay and causing said motor to be energized moving said track switch back to its normal position in response to said driving unit's passing of a point beyond said track switch, a limit switch actuated by the completion of said track switch's return to normal position, a circuit for tripping said relay and causing said motor to be stopped, said latter tripping circuit being closed by the actuation of said latter limit switch.

9. In the control circuit for an exit track switch recited in claim 8, an auxiliary spring return relay energized by either of said closing circuits, and maintained by a circuit responsive to the actuation of either of said limit switches, said auxiliary relay having contacts interposed in said tripping and auxiliary relay energizing circuits in a manner whereby each of said tripping circuits will be effective to stop said motor only upon the completion of the track switch's movement to either operative position.

10. In a conveyor system such as recited in claim 8 wherein each of said driving units has a driving motor and a motor contactor for controlling the power supply to said motor, means for stopping a driving unit's approach to an exit track switch from either direction whenever said exit track switch is not in a corresponding receiving position comprising a control conductor bar mounted along each of the lines leading to said exit track switch, a collector shoe located on each of said driving units for contacting either of said conductor bars, an insulated section in each of said conductor bars before each exit track switch, an energizing circuit for each of said insulated sections of conductor bar controlled, respectively, by said first and second mentioned limit switches, an energizing circuit for each of said motor contactors controlled by either of said insulated sections of conductor bar, said energizing circuits being combined in a manner whereby the movement of said exit track switch away from one position will interrupt the energizing circuit to the motor contactor of a driving unit approaching said exit track switch along a corresponding line and in a manner whereby the energizing circuit to said motor contactor may not be re-established until said exit track switch has returned to such position.

11. In a conveyor system having a main line, one or more branch lines, each of said branch lines being provided with a two position entrance track switch leading from said main line to said branch line and with a two position exit track switch leading back to said main line, a continuous power supply along said main and each of said branch lines, one or more self-propelled electrically powered driving units, each of said driving units having a driving motor and a motor contactor for controlling the power supply to said motor, said driving units having a plurality of possible destinations within said conveyor system, any one of which may be reached by passing through one or more of said entrance track switches, the return of any driving unit from any destination to the main line being accomplished by passing through one or more of said exit track switches, said conveyor system being provided with means for causing each exit track switch through which a driving unit may pass to be in a proper receiving position comprising a track switch motor, driving means between said motor and said exit track switch for alternately moving said track switch to each of its operative positions, a mechanically held two position relay for controlling the energizing circuit for said track switch motor, a circuit for closing said relay and causing said motor to be energized moving said track switch from its normal to its other operative position in response to an approaching driving unit's passing of a point in the line corresponding to said other operative position, said conveyor system being also provided with means for stopping a driving unit's approach to an exit track switch from either direction while a preceding driving unit is passing through said track switch in normal position comprising a control conductor bar mounted along each of the lines leading to said exit track switch, a collector shoe located on each of said driving units for contacting either of said conductor bars, an insulated section in each of said conductor bars before each exit track switch, a second mechanically held two position relay, an energizing circuit for said insulated sections of conductor bar controlled by said second relay, an energizing circuit for each of said motor contactors, said energizing circuits being combined in a manner whereby the closing of said second relay will interrupt the energizing circuit to the motor contactor of said approaching driving unit and in a manner whereby the tripping of said second relay will re-establish the energizing circuit to said motor contactor, and means for closing said second relay upon the approach of a driving unit and for tripping said second relay upon completion of a driving unit's travel through said switch in normal position; means for establishing priority for one of two driving units simultaneously approaching said exit track switch along different lines in a manner such as to cause both of said relays to be simultaneously closed comprising a circuit for tripping one of said relays, said circuit being closed upon the simultaneous closing of said relays.

12. In a conveyor system such as described in claim 11 wherein the respective means for closing said relays include an insulated conducting member located in each of said conductor bars before said exit track switch, a collector shoe on each of said driving units for contacting said conductor bars and energizing said conducting members; an identical second insulated conducting member located in said conductor bars beyond said first mentioned conducting members a distance somewhat greater than the required stopping distance for a driving unit whereby a second circuit for closing the respective relays will be established in the event the first circuit is not effectively established.

13. In a conveyor system of the type wherein one or more self-propelled electrically powered driving units travel along a conveyor line, each of said driving units having a plurality of possible destinations in such line, and in order for any driving unit to travel from a given point in the system to a particular destination, it is required that such driving unit give one or more positive selective signals at one or more certain signal points along its path; a selective signal means comprising a stepping device located on each driving unit for each group of signal points from which a single selection must be made, each of said devices having a number of steps equal to the number of signal points in such group, means for causing said device to progressively take a step each time a signal point of said group is approached, and means for causing a positive signal to be given after a predeterminable number of steps have been taken.

14. In a conveyor system of the type wherein one or more self-propelled electrically powered driving units travel along a conveyor line, each of said driving units having a plurality of possible destinations in such line, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, conductor bars mounted along said conveyor line, collector shoes carried by each of said driving units for contacting said conductor bars, and means carried in said conductor bars and contacted by said collector shoes for causing said relay to progressively take a step each time a signal point of said group is approached, and means for causing a positive signal to be given after a predetermined number of steps have been taken.

15. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, conductor bars mounted along said conveyor lines, collector shoes carried by each of said driving units for contacting said conductor bars, and means carried in said conductor bars adjacent each of said signal points for energizing the stepping coil of said relay causing said relay to progressively take a step each time said means are contacted by the collector shoes of a passing driving unit, and means for causing a positive signal to be given after a predeterminable number of steps have been taken.

16. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, a collector shoe carried by said driving unit, an insulated section of conductor bar adjacent each of said signal points contacted by said collector shoe in passing, means for energizing said insulated section, a circuit through the stepping coil of said relay energized by the contact of said collector shoe with said energized section, and means for causing a positive signal to be given after a predeterminable number of steps have been taken.

17. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, a normally energized conductor bar mounted along said conveyor lines, a collector shoe carried by each of said driving units for contacting said conductor bar, an insulated pulse section located in said conductor bar adjacent each of said signal points in a position to be contacted and energized by said collector shoe in passing, a circuit energized by said energized pulse section for causing said relay to progressively take a step each time a signal point of said group is approached, and means for causing a positive signal to be given after a predeterminable number of steps have been taken.

18. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, a normally energized conductor bar mounted along said conveyor line, an insulated section of conductor bar adjacent each of said signal points, collector shoes carried by said driving unit for contacting said conductor bar and section of conductor bar, an insulated pulse section located in said conductor bar adjacent each of said signal points in a position to be contacted and energized by said collector shoe in passing, a circuit connecting said pulse section and said insulated section of conductor bar for energizing said latter section, a circuit through the stepping coil of said relay energized by the contact of said collector shoe with said energized section, and means for causing a positive signal to be given after a predeterminable number of steps have been taken.

19. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, means for causing said relay to progressively take a step each time a signal point of said group is approached, a selection member associated with said stepping relay having a number of settings equal to the number of steps of said relay, a circuit within said relay established when the number of steps taken by said relay corresponds to a particular setting of said selection member, and means for causing said circuit to result in a positive signal.

20. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, means for causing said relay to progressively take a step each time a signal point of said group is approached, a selection member associated with said stepping relay having a number of settings equal to the number of steps of said relay, a circuit within said relay established when the number of steps taken by said relay corresponds to a particular setting of said selection member, a resetting mechanism in said relay actuated by said circuit for causing said relay to return to its zero position, a second circuit established through the contactor of said relay when in its zero position, and means for causing said second circuit to result in a positive signal.

21. In a stepping relay of the type recited in claim 20 wherein each successive step is effected by the angular movement through a unit distance of a ratchet wheel against a torsion spring, backward movement being arrested by a pawl normally urged into engagement with teeth formed in said ratchet wheel, and wherein resetting is accomplished by electrically actuated means holding said pawl out of normal engagement, means for maintaining said resetting circuit after it is initially established and after said ratchet wheel has started its return travel comprising an auxiliary relay in parallel circuit with said resetting circuit and energized thereby, a branch circuit common to said electrically actuated means and said auxiliary relay, said branch circuit passing through a normally open contact which is closed upon energizing said auxiliary relay, and means for causing said branch circuit to remain closed until said ratchet wheel has returned to its zero position and thereupon to re-open de-energizing both of said parallel circuits.

22. In a stepping relay of the type recited in claim 20 wherein each successive step is effected by the angular movement through a unit distance of a ratchet wheel against a torsion spring, backward movement being arrested by a pawl normally urged into engagement with the teeth in said ratchet wheel, and wherein resetting is accomplished by electrically actuated means holding said pawl out of normal engagement, means for maintaining said resetting circuit after it is initially established and after said ratchet wheel has started its return travel comprising an auxiliary relay in parallel circuit with said resetting circuit and energized thereby, said auxiliary relay having a normally open contact whch is closed upon energizing such relay, a cam moved by said ratchet wheel, a limit switch actuated by said cam, said limit switch having a contact open when said ratchet wheel and cam are at zero position and closed when said ratchet wheel and cam are at any other position, a branch energizing circuit common to said electrically actuated means and to said auxiliary relay, said branch circuit passing in series through said normally open auxiliary relay contact and through the contact of said limit switch.

23. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, means for causing said relay to progressively take a step each time a signal point of said group is approached, an insulated section of conductor bar at each of said signal points, a conductor shoe carried by said driving unit for contacting said section, a selection member associated with said stepping relay having a number of settings equal to the number of steps of said relay, a circuit within said relay established when the number of steps taken by said relay corresponds to a particular setting of said selection member, a resetting mechanism in said relay actuated by said circuit for causing said relay to return to its zero position, a second circuit established through the contactor of said relay when in its zero position for energizing said conductor shoe and in turn said section of conductor bar, and means for causing said energized section of conductor bar to result in a positive signal.

24. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one positive selective signal at one of a group of signal points along its path; a selective signal means comprising a stepping relay located on each driving unit, said stepping relay having a number of steps equal to the number of signal points in said group, means for causing said relay to progressively take a step each time a signal point of said group is approached, an insulated section of conductor bar at each of said signal points, a conductor shoe carried by said driving unit for contacting said section, a selection member associated with said stepping relay having a number of settings equal to the number of steps of said relay, a circuit within said relay established when the number of steps taken by said relay corresponds to a particular setting of said selection member, a resetting mechanism in said relay actuated by said circuit for causing said relay to return to its zero position, and a second circuit established through the contactor of said relay when in its zero position for energizing said conductor shoe and in turn said section of conductor bar, thereby effecting a positive signal.

25. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, means for causing said relay to progressively take a step each time a signal point of said group is approached, an insulated section of conductor bar at each of said signal points, a conductor shoe carried by said driving unit for contacting said section, a selection member associated with said stepping relay having a number of settings equal to the number of steps of said relay, a circuit within said relay established when the number of steps taken by said relay corresponds to a particular setting of said selection member, a resetting mechanism in said relay actuated by said circuit for causing said relay to return to its zero position, a second circuit established through said relay when in its zero position for energizing said conductor shoe and in turn said section of conductor bar, a normally energized conductor bar mounted along said conveyor lines, a collector shoe carried by each of said driving units for contacting said conductor bar, an insulated pulse section located in said conductor bar at each of said signal points and spaced relative to said insulated sections of conductor bar in a manner differentiating each group of signal points from any other group, said pulse section and said section of conductor bar being in a series signal circuit in a manner resulting in a positive signal when simultaneously energized.

26. In a conveyor system of the type wherein one or more self-propelled electrically powered driving units travel along endless connecting conveyor lines and have a plurality of possible destinations in such lines, and in order for any driving unit to travel from a given point in the system to a particular destination, it is required that such driving unit give one or more positive selective signals at one or more certain signal points along its path; a selective signal means comprising a stepping relay located on each driving unit for each group of signal points from which a single selection must be made, each of said stepping relays having a number of steps equal to the number of signal points in such group, a normally energized conductor bar mounted along said conveyor line, a collector shoe carried by said driving unit for contacting said conductor bar, an insulated pulse section located in said conductor bar before each of said signal points, a second pulse section located in said conductor bar at each of said signal points, each of said pulse sections being positioned to be contacted and energized by said collector shoe in passing, an insulated section of conductor bar connected in a series circuit with said first pulse section, a second insulated section of conductor bar connected in a series circuit with said second pulse section, a second collector shoe carried by said driving unit for contacting each of said insulated sections of conductor bar at the time said first and second pulse sections are respectively energized, a circuit through the stepping coil of said relay energized by the contact of said second collector shoe with said first insulated section, a selection member associated with said stepping relay having a number of settings equal to the number of steps of said relay, a circuit within said relay established when the number of steps taken by said relay corresponds to a particular setting of said selection member, a resetting mechanism in said relay actuated by said circuit for causing said relay to return to its zero position, a second circuit established through the contactor of said relay when in its zero position for energizing said second conductor shoe and in turn said second insulated section of conductor bar, the series circuit between said second pulse section and said second insulated section of conductor bar including a relay energized upon the simultaneous energizing of such pulse and insulated sections thereby completing a positive signal, the combined resistance of the energizing coil of said latter relay and said stepping coil being great enough to prevent the effective energizing of either coil when said stepping relay is in other than zero position.

27. In a conveyor system wherein self-propelled electrically powered driving units travel along a conveyor line, each of which driving units may move from a given point in the conveyor system to any of a plurality of possible destinations under the control of an automatic control system, a selective signalling system comprising one or more groups of signal points along the path of said driving unit, means associated with said driving unit for registering the number of signal points of any group passed by said driving unit, and means for causing an electrical signal to be given after said driving unit has passed a pre-determined number of said signal points whereby one or more selective signals required in order for said driving unit to reach a pre-determined destination may be automatically given by said driving unit.

28. In a conveyor system wherein self-propelled electrically powered driving units travel along a conveyor line, each of which driving units may move from a given point in the conveyor system to any of a plurality of possible destinations under the control of an automatic control system, a selective signalling system comprising one or more groups of signal points along the path of said driving unit, means associated with said driving unit for registering the number of signal points of any group passed by said driving unit, means for causing an electrical signal to be given after said driving unit has passed a pre-determined number of said signal points whereby one or more selective signals required in order for said driving unit to reach a pre-determined destination may be automatically given by said driving unit and manually actuated selection means for determining the number of signal points of any group which will be passed before a selective signal is given.

29. In a conveyor system of the type wherein self-propelled electrically powered driving units travel along endless connecting unidirectional conveyor lines and have a plurality of possible destinations in such lines along a plurality of routes, and wherein the movement of said driving units from given points in said conveyor system to various destinations may require automatically controlled intermittent stopping and starting of said driving units as well as automatically controlled movement of track switches, means for dispatching said driving units to predetermined destinations characterized by a control system including a continuous constantly energized electrical power supply throughout said conveyor lines, collector means associated with each driving unit for receiving said power, a separate control conductor extending throughout said conveyor lines, separate collector means for contacting said control conductor, said control conductor being provided with a plurality of insulated sections capable of being independently energized and de-energized, a control circuit in each driving unit responsive to the engagement of said latter collector means with a de-energized control section for stopping said driving unit, and a control circuit responsive to the energizing of said control section for starting said driving unit.

30. In a conveyor system as set forth in claim 29 a selective signal means comprising a plurality of fixed resistances at each signal point in the conveyor line, a variable resistance device located on the driving unit for each group of signal points from which a single selection must be made, each of said variable resistance devices being adjustable to a number of positions equal to the number of signal points from which such single selection must be made, said fixed resistances at each signal point of a group being arranged to form a portion of a bridge circuit completed by one of said variable resistance devices as the driving unit passes each of said signal points, each set of said fixed resistors within a group of signal points being chosen to correspond to a balanced bridge condition in conjunction with one particular position of said variable resistance device and an unbalanced bridge condition in conjunction with all other positions, and means for deriving a positive electrical signal from said balanced bridge condition.

31. In a conveyor system as set forth in claim 29 a selective signal means comprising a plurality of fixed resistances at each signal point in the conveyor line, a variable resistance device located on the driving unit for each group of signal points from which a single selection must be made, each of said variable resistance devices being adjustable to a number of positions equal to the number of signal points from which such single selection must be made, said fixed resistances at each signal point of a group being arranged to form a portion of a bridge circuit completed by one of said variable resistance devices as the driving unit passes each of said signal points, each set of said fixed resistors within a group of signal points being chosen to correspond to a balanced bridge condition in conjunction with one particular position of said variable resistance device and an unbalanced bridge condition in conjunction with all other positions, and means for deriving a positive electrical signal from said balanced bridge condition comprising a solenoid relay placed in a circuit across said bridge, said relay being deenergized when said bridge is in balanced condition and energized when said bridge is in an unbalanced condition.

32. In a conveyor system as set forth in claim 29 a selective signal means comprising a plurality of fixed resistances at each signal point in the conveyor line, a variable resistance device located on the driving unit for each group of signal points from which a single selection must be made, each of said variable resistance devices being adjustable to a number of positions equal to the number of signal points from which such single selection must be made, said fixed resistances at each signal point of a group being arranged to form a portion of a bridge circuit completed by one of said variable resistance devices as the driving unit passes each of said signal points, each set of said fixed resistors within a group of signal points being chosen to correspond to a balanced bridge condition in conjunction with one particular position of said variable resistance device and an unbalanced bridge condition in conjunction with all other positions, and means for deriving a positive electrical signal from said balanced bridge condition comprising a solenoid relay placed in a circuit across said bridge, said relay being de-energized when said bridge is in balanced condition and energized when said bridge is in an unbalanced condition and said relay having circuit contacts which are closed when said relay is de-energized and open when said relay is energized, said circuit contacts completing a positive selective signal circuit.

33. In a conveyor system as set forth in claim 29 a selective signal means comprising three fixed resistances at each signal point in said conveyor line, two of which are connected in series to a source of electrical power at one end and grounded at the other end, an insulated section of conductor bar mounted along said conveyor line at each signal point, one of said fixed resistances being connected between said source of power and said insulated section of conductor bar, a stepped resistor located on each of said driving units for each group of signal points from which a single selection must be made, each of said stepped resistors having a number of steps equal to the number of signal points from which such single selection must be made, a conducting member positioned on each of said driving units to contact said section of conductor bar in passing, said stepped resistor being connected at one end to said conducting member and said stepped resistor being grounded at the other end, said fixed resistances at each signal point of a group being chosen to give an equal voltage drop in the two resistances connected to the said source of power when the said stepped resistor is set at a particular position and an unequal voltage drop for all other settings of said stepped resistor, and means for deriving a positive electrical signal when said voltage drop is equal.

34. In a conveyor system as set forth in claim 29 a selective signal means comprising three fixed resistances at each signal point in said conveyor line, two of which are connected in series to a source of electrical power at one end and grounded at the other end, an insulated section of conductor bar mounted along said conveyor line at each signal point, one of said fixed resistances being connected between said source of power and said insulated section of conductor bar, a stepped resistor located on each of said driving units for each group of signal points from which a single selection must be made, each of said stepped resistors having a number of steps equal to the number of signal points from which such single selection must be made, a conducting member positioned on each of said driving units to contact said section of conductor bar in passing, said stepped resistor being connected at one end to said conducting member and said stepped resistor being grounded at the other end, said fixed resistances at each signal point of a group being chosen to give an equal voltage drop in the two resistances connected to the said source of power when the said stepped resistor is set at a particular position and an unequal voltage drop for all other settings of said stepped resistor, and means for deriving a positive electrical signal when said voltage drop is equal comprising a circuit across the lower potential ends of the two resistances connected to said source of power, a solenoid relay in said circuit, said relay being de-energized when said voltage drop is equal and energized when said voltage drop is unequal, and said relay having a normally closed contact which is opened when said relay is energized, said closed contact completing a positive selective signal circuit.

35. In a conveyor system as set forth in claim 29 a selective signal means comprising three fixed resistances at each signal point in the conveyor line, two of which are connected in series to a source of electrical power at one end and grounded at the other end, an insulated section of conductor bar mounted along said conveyor line at each signal point, one of said fixed resistances being connected between said source of power and said insulated section of conductor bar, a stepped resistor located on each of said driving units for each group of signal points from which a single selection must be made, each of said stepped resistors having a number of steps equal to the number of signal points from which such single selection must be made, a conducting member positioned on each of said driving units to contact said section of conductor bar in passing, said stepped resistor being connected at one end to said conducting member and said stepped resistor being grounded at the other end, said fixed resistances at each signal point of a group being chosen to give an equal voltage drop in the two resistances connected to the said source of power when the said stepped resistor is set at a particular position and an unequal voltage drop for all other settings of said stepped resistor, means for deriving a positive electrical signal when said voltage drop is equal comprising a circuit across the lower potential ends of the two resistances connected to said source of power, a solenoid relay in said circuit, said relay being de-energized when said voltage drop is equal and energized when said voltage drop is unequal, and said relay having a normally closed contact which is opened when said relay is energized, said closed contact completing a positive selective signal circuit, and a second normally de-energized solenoid relay which is energized when said conducting member contacts said insulated section of conductor bar, said circuit to ground through said fixed resistances passing through a normally open contact in said second relay which is closed when said relay is energized.

36. In a conveyor system as set forth in claim 29 a selective signal means comprising three fixed resistances at each signal point in the conveyor line, two of which are connected in series to a source of electrical power at one end and grounded at the other end, an insulated section of conductor bar mounted along said conveyor line at each signal point, one of said fixed resistances being connected between said source of power and said insulated section of conductor bar, a stepped resistor located on each of said driving units for each group of signal points from which a single selection must be made, each of said stepped resistors having a number of steps equal to the number of signal points from which such single selection must be made, a conducting member positioned on each of said driving units to contact said section of conductor bar in passing, said stepped resistor being connected at one end to said conducting member and said stepped resistor being grounded at the other end, said fixed resistances at each signal point of a group being chosen to give an equal voltage drop in the two resistances connected to the said source of power when the stepped resistor is set at a particular position and an unequal voltage drop for all other settings of said stepped resistor, means for deriving a positive electrical signal when said voltage drop is equal comprising a circuit across the lower potential ends of the two resistances connected to said source of power, a solenoid relay in said circuit, said relay being de-energized when said voltage drop is equal and energized when said voltage drop is unequal, and said relay having a normally closed contact which is opened when said relay is energized, said closed contact completing a positive selective signal circuit, a second normally deenergized solenoid relay which is energized when said conducting member contacts said insulated section of conductor bar, said circuit to ground through said fixed resistances passing through a normally open contact in said second relay which is closed when said relay is energized, and a third normally de-energized relay which becomes energized after said conducting member has passed said insulated section of conductor, the circuit through the solenoid coil of said second relay passing through normally closed contacts in said third relay which are opened when said third relay becomes energized, the said conducting member for each of said stepped resistors located on a driving unit being spaced longitudinally from the others so as to contact said insulated section of conductor at different relative times, and said circuit passing through said first mentioned relay being momentarily energized after the said conducting member for a stepped resistor corresponding to a particular group of signal points has contacted said insulated section of conductor bar.

37. In a conveyor system of the type wherein there is a single endless main conveyor line, any number of branch lines connected to said main line by entrance and exit switches, any number of stopping points in said lines, and wherein a plurality of electrically powered self-propelled driving units adapted to travel on said conveyor lines are dispatchable to any of a plurality of destinations which may require automatically controlled intermittent stopping and starting of said driving units as well as automatically controlled movement of said track switches, means for selectively dispatching said driving units to any predetermined destination characterized by a control system including a continuous constantly energized electrical power supply throughout said cgonveyor lines, collector means on each driving unit for receiving power from said supply, a control conductor extending throughout said conveyor lines separated from said power supply, separate collector means for contacting said control conductor, said control conductor being provided with a plurality of insulated sections capable of being independently energized and de-energized, a control circuit in each driving unit responsive to the engagement of said latter collector means with a de-energized control section for stopping said driving unit, a control circuit responsive to the energizing of said control section for starting said driving unit, and said control conductor being also provided with a plurality of insulated electrical contact members in the path of said last-mentioned collector means capable of momentarily completing an electrical circuit upon being contacted by said collector means thereby providing non-selective electrical signals in response to the passing of said driving units.

38. In a conveyor system of the type wherein self-propelled electrically powered driving units travel along endless connecting uni-directional conveyor lines and have a plurality of possible destinations in said lines and wherein said driving units are dispatchable to any of said destinations in a manner which may require automatically controlled intermittent stopping and starting as well as automatically controlled movement of track switches, means for selectively dispatching said driving units to any predetermined destination characterized by a control system including both continuously energized power and normally energized control conductors throughout said lines, separate collector means on each driving unit for receiving power and contacting said control conductor, said control conductor being provided with a plurality of insulated sections capable of being independently energized and de-energized, a control circuit in each driving unit responsive to the engagement of said latter collector means with a de-energized control section for stopping said driving unit, a control circuit responsive to the energizing of said control section for starting said driving unit, and one of said conductors being provided with a plurality of insulated electrical contact members in the path of the corresponding collector means capable of momentarily completing an electrical circuit upon being contacted by said collector means thereby providing non-selective electrical signals in response to the passing of said driving units.

39. In a conveyor system of the type wherein self-propelled electrically powered driving units travel along endless connecting uni-directional conveyor lines and have a plurality of possible destinations in said lines and wherein said driving units are dispatchable to any of said destinations in a manner which may require automatically controlled intermittent stopping and starting as well as automatically controlled movement of track switches, means for selectively dispatching said driving units to any predetermined destination characterized by a control system including a total of two electrical conductor bars extending throughout said lines, collector means on said driving units for contacting each of said conductor bars, one of said bars being continuously energized and provided with a plurality of insulated electrical contact members in the path of the corresponding collector means capable of momentarily completing an electrical circuit upon being contacted by said collector means thereby providing non-selective electrical signals in response to the passing of said driving units, the other of said conductor bars being generally insulated from any electrical circuit and provided with a plurality of separately insulated sections capable of being independently energized and de-energized, a control circuit in each driving unit responsive to the engagement of said latter collector means with a de-energized control section for stopping said driving unit, and a control circuit responsive to the energizing of said control section for starting said driving unit.

40. In an electrical control circuit wherein a principal mechanically held relay is closed by one circuit and tripped to normal position by a second circuit, normally closed and open contacts of said relay respectively in said closing and tripping circuits, said contacts being reversed when said relay is closed, said tripping circuit including also a normally closed contact adapted to open after an appreciable time lag following the closing of said relay, temporary means for holding said tripping circuit open during said time lag comprising a spring return auxiliary relay, a circuit for energizing said auxiliary relay when said principal relay closing circuit is established, a circuit for sustaining said auxiliary relay in energized condition passing through the normally closed contact of said tripping circuit, and normally open and closed contacts of said auxiliary relay respectively in said sustaining and tripping circuits, said last two contacts being reversed when said auxiliary relay is energized.

41. In an electrical control circuit wherein a principal mechanically held relay is closed by one of parallel circuits and tripped to normal position by one of other parallel circuits, normally closed and open contacts of said relay respectively in said closing and tripping circuits, said contacts being reversed when said relay is closed, one of said tripping circuits including a normally closed contact adapted to open after a substantial time lag following the closing of said relay, a second of said tripping circuits including a normally open contact adapted to close after a further substantial time has expired, temporary means for preventing the establishment of a tripping circuit during said first time lag comprising a spring return auxiliary relay, a circuit for energizing said auxiliary relay when a closing circuit is established for said principal relay, a circuit for sustaining said auxiliary relay in energized condition passing through the normally closed contact of said first tripping circuit, and normally open and closed contacts of said auxiliary relay respectively in said sustaining and tripping circuits, said last two contacts being reversed when said auxiliary relay is energized.

42. In a conveyor system having a main line, one or more branch lines, each of said branch lines being provided with a two position entrance track switch leading from said main line to said branch line and with a two position exit track switch leading back to said main line, a continuous power supply along said main and each of said branch lines, a plurality of self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; a control circuit for each exit track switch including means for causing each exit track switch through which a driving unit may pass to be in a proper receiving position characterized by means for normally retaining said track switch in one of its two operative positions, electrically energized means for moving said track switch from its normal to its other position in response to a momentary electrical signal initiated by any driving unit approaching said track switch from a line corresponding to said other position, means for stopping a driving unit's approach to an exit track switch from either direction while a preceding driving unit is passing through said track switch in normal position comprising a normally energized conductor bar mounted along each of the lines leading to said exit track switch, a collector shoe located on each of said driving units for contacting either of said conductor bars, an insulated section in each of said conductor bars before each exit track switch, a control circuit for each of said driving units, an exit track switch control circuit causing said insulated sections of conductor bar to be de-energized to establish a block for stopping a succeeding driving unit when contacted by its collector shoe in response to the approach of a driving unit and to restore said insulated sections to normal energized nonblocking condition upon the passage of a driving unit through said switch in normal position.

43. In a conveyor system having a main line, one or more branch lines, each of said branch lines being provided with a two position entrance track switch leading from said main line to said branch line and with a two position exit track switch leading back to said main line, a continuous power supply along said main and each of said branch lines, one or more self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; a control circuit for each exit track switch including means for causing each exit track switch through which a driving unit may pass to be in a proper receiving position characterized by means for normally retaining said track switch in one of its two operative positions, electrically energized means for moving said track switch from its normal to its other position in response to a momentary electrical signal initiated by any driving unit approaching said track switch from a line corresponding to said other position, means for stopping a driving unit's approach to an exit track switch from either direction while said exit track switch is in motion comprising a conductor bar mounted along each of the lines leading to said exit track switch, a collector shoe located on each of said driving units for contacting either of said conductor bars, an insulated section in each of said conductor bars before each exit track switch, a control circuit for each of said driving units, said exit track switch control circuit causing said insulated sections of conductor bar to establish a block for stopping a driving unit when contacted by its collector shoe in response to movement of said track switch, and to restore said insulated sections to normal nonblocking condition upon completion of said movement.

44. In a conveyor system having a main line, one or more branch lines, each of said branch lines being provided with a two position entrance track switch leading from said main line to said branch line and with a two position exit track switch leading back to said main line, a continuous power supply along said main and each of said branch lines, one or more self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; a control circuit for each exit track switch including means for causing each exit track switch through which a driving unit may pass to be in a proper receiving position characterized by means for normally retaining said track switch in one of its two operative positions, electrically energized means for moving said track switch from its normal to its other position in response to a momentary electrical signal initiated by any driving unit approaching said track switch from a line corresponding to said other position, means for stopping a driving unit's approach to an exit switch from either direction whenever said exit track switch is not in a corresponding receiving position comprising a conductor bar mounted along each of the lines leading to said exit track switch, a collector shoe located on each of said driving units for contacting either of said conductor bars, an insulated section in each of said conductor bars before each exit track switch, a control circuit for each of said driving units, said exit track switch control circuit causing each of said insulated sections of conductor bar to establish a block for stopping a driving unit when contacted by its collector shoe in response to the respective movement of said exit track switch away from said corresponding receiving position, and to restore said insulated sections to normal nonblocking condition when said switch is in correct receiving position.

45. In a conveyor system having a main line, one or more branch lines, each of said branch lines being provided with a two position entrance track switch leading from said main line to said branch line and with a two position exit track switch leading back to said main line, a continuous power supply along said main and each of said branch lines, a plurality of self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; a control circuit for each exit track switch including means for causing each exit track switch through which a driving unit may pass to be in a proper receiving position characterized by means for normally retaining said track switch in one of its two operative positions, electrically energized means for moving said track switch from its normal to its other position in response to a momentary electrical signal initiated by any driving unit approaching said track switch from a line corresponding to said other position, each of said driving units having a driving motor and a motor contactor for controlling the power supply to said motor, means for stopping a driving unit's approach to an exit track switch from either direction while a preceding driving unit is passing through said track switch in normal position comprising a control conductor bar mounted along each of the lines leading to said exit track switch, a collector shoe located on each of said driving units for contacting either of said conductor bars, an insulated section in each of said conductor bars before each exit track switch, a mechanically held two position relay, an energizing circuit for said insulated sections of conductor bar controlled by said relay, an energizing circuit for each of said motor contactors, said energizing circuits being combined in a manner whereby the closing of said relay will interrupt the energizing circuit to the motor contactor of said approaching driving unit and in a manner whereby the tripping of said relay will re-establish the energizing circuit to said motor contactor, and means for closing said relay upon the approach of a driving unit and for tripping said relay upon completion of a driving unit's travel through said switch in normal position.

46. In a conveyor system having a main line, one or more branch lines, each of said branch lines being provided with a two position entrance track switch leading from said main line to said branch line and with a two position exit track switch leading back to said main line, a continuous power supply along said main and each of said branch lines, a plurality of self-propelled electrically powered driving units, said driving units having a plurality of possible destinations within said conveyor system any one of which may be reached by passing through one or more of said entrance track switches, the return of any driving unit from any destination to the main line being accomplished by passing through one or more of said exit track switches; a control circuit for each exit track switch including means for causing each exit track switch through which a driving unit may pass to be in a proper receiving position characterized by means for normally retaining said track switch in one of its two operative positions, electrically energized means for moving said track switch from its normal to its other position in response to a momentary electrical signal initiated by any driving unit approaching said track switch from a line corresponding to said other position, each of said driving units having a driving motor and a motor contactor for controlling the power supply to said motor, means for stopping a driving unit's approach to an exit track switch from either direction while a preceding driving unit is passing through said track switch in normal position comprising a control conductor bar mounted along each of the lines leading to said exit track switch, a collector shoe located on each of said driving units for contacting either of said conductor bars, an insulated section in each of said conductor bars before each exit track switch, a mechanically held two position relay, an energizing circuit for said insulated sections of conductor bar controlled by said relay, an energizing circuit for each of said motor contactors, said energizing circuits being combined in a manner whereby the closing of said relay will interrupt the energizing circuit to the motor contactor of said approaching driving unit and in a manner whereby the tripping of said relay will re-establish the energizing circuit to said motor contactor, and means for closing said relay upon the approach of a driving unit and for tripping said relay upon completion of a driving unit's travel through said switch in normal position, said latter means comprising an insulated conducting member located in said conductor bar before said exit track switch, a second insulated conducting member located in said conductor bar beyond said exit track switch, said insulated conducting members being contacted and energized by the passing of said collector shoe, and said energized conducting members completing, respectively, a closing circuit and a tripping circuit for said relay.

References Cited in the file of this patent

UNITED STATES PATENTS

| Number | Name | Date |
|---|---|---|
| 732,559 | Hilton | June 30, 1903 |
| 1,243,457 | Stuart | Oct. 16, 1917 |
| 1,354,789 | Whiting | Oct. 5, 1920 |
| 1,354,790 | Whiting | Oct. 5, 1920 |
| 1,381,317 | Loughridge | June 14, 1921 |
| 1,564,912 | Thorn | Dec. 8, 1925 |
| 1,577,392 | Venables | Mar. 16, 1926 |
| 1,625,501 | Robertson | Apr. 19, 1927 |
| 1,686,251 | Phillips | Oct. 2, 1928 |
| 1,937,760 | Jones | Dec. 5, 1933 |
| 2,084,879 | Weise | June 22, 1937 |
| 2,102,995 | Coombs | Dec. 21, 1937 |
| 2,161,388 | Rosenthal | June 6, 1939 |
| 2,254,285 | Harris et al. | Sept. 2, 1941 |
| 2,385,917 | Harwood et al. | Oct. 2, 1945 |
| 2,401,115 | Spafford | May 28, 1946 |

FOREIGN PATENTS

| Number | Country | Date |
|---|---|---|
| 382,973 | Great Britain | Nov. 10, 1932 |